(12) United States Patent
Jung et al.

(10) Patent No.: US 11,511,411 B2
(45) Date of Patent: Nov. 29, 2022

(54) MOVABLE ROBOT

(71) Applicant: LG ELECTRONICS INC., Seoul (KR)

(72) Inventors: Chungin Jung, Seoul (KR); Sunho Yang, Seoul (KR); Eulpyo Hong, Seoul (KR)

(73) Assignee: LG ELECTRONICS INC., Seoul (KR)

(*) Notice: Subject to any disclaimer, the term of this patent is extended or adjusted under 35 U.S.C. 154(b) by 286 days.

(21) Appl. No.: 16/733,062

(22) Filed: Jan. 2, 2020

(65) Prior Publication Data

US 2020/0206902 A1 Jul. 2, 2020

(30) Foreign Application Priority Data

Jan. 2, 2019 (WO) ................ PCT/KR2019/000058

(51) Int. Cl.
| | |
|---|---|
| *B25J 5/00* | (2006.01) |
| *B25J 9/00* | (2006.01) |
| *B25J 19/00* | (2006.01) |
| *B25J 19/02* | (2006.01) |
| *B25J 9/16* | (2006.01) |

(52) U.S. Cl.
CPC ............ *B25J 9/0009* (2013.01); *B25J 5/007* (2013.01); *A47L 2201/04* (2013.01); *B25J 9/1656* (2013.01); *B25J 19/005* (2013.01); *B25J 19/021* (2013.01)

(58) Field of Classification Search
CPC .. B25J 15/0408; B25J 11/0085; B25J 11/008; B25J 5/007; B25J 9/0009
USPC ................................ 180/89.13, 89.14, 89.18
See application file for complete search history.

(56) References Cited

U.S. PATENT DOCUMENTS

| | | | | |
|---|---|---|---|---|
| 4,429,759 A | * | 2/1984 | Clark ................... | B62D 33/071 |
| | | | | 296/35.1 |
| 2014/0379129 A1 | | 12/2014 | Edsinger et al. | |
| 2015/0012163 A1 | | 1/2015 | Crawley | |
| 2017/0057081 A1 | * | 3/2017 | Krohne ...................... | B25J 9/08 |
| 2017/0129099 A1 | | 5/2017 | Alduaiji et al. | |
| 2018/0178375 A1 | * | 6/2018 | Yang ...................... | B25J 9/1694 |
| 2018/0363282 A1 | * | 12/2018 | D'Souza ................ | B25J 13/081 |

FOREIGN PATENT DOCUMENTS

| | | |
|---|---|---|
| KR | 10-2009-0007818 A | 1/2009 |
| KR | 10-1819317 B1 | 1/2018 |
| WO | WO 2017/198214 A1 | 11/2017 |

* cited by examiner

*Primary Examiner* — Randell J Krug
(74) *Attorney, Agent, or Firm* — Birch, Stewart, Kolasch & Birch, LLP

(57) ABSTRACT

Provided is a movable robot. The movable robot includes a main body provided with a traveling part; at least one through-hole defined in a top surface of the main body, at least one module guide configured to guide an installation position of a service disposed above the main body, and guide supporter rotatably supporting the module guide inside main body. The module guide may rotate between a first position within the main body and a position protruding upward from the main body through the through-hole.

11 Claims, 20 Drawing Sheets

MOVABLE ROBOT

CROSS-REFERENCE TO RELATED APPLICATIONS

The present application claims priority under 35 U.S.C. 119 and 35 U.S.C. 365 to Patent Application No. PCT/KR2019/000058, filed Jan. 2, 2019, which is hereby incorporated by reference in its entirety.

BACKGROUND

The present disclosure relates to a movable robot capable of autonomous traveling.

Robots have been developed for industrial use in order to be part of factory automation. In recent years, fields of application of the robots have been expanded, and thus, robots that are used in everyday life as well as medical robots and aerospace robots are being developed.

Such a robot for the daily life provides specific services (e.g., shopping, serving, talking, cleaning, etc.) in response to a user's command.

However, since the existing robots for the daily life are designed to provide only a specific service, there is a limitation that cost-effective utilization of the robots is not high.

As a result, in recent years, there is a need for robots capable of providing various services.

SUMMARY

Embodiments provide a movable robot on which a service module is capable of being easily mounted.

Embodiment also provide a movable robot in which a module guide and a module coupling part are hidden when the movable robot travels alone.

In one embodiment, a movable robot includes: a main body provided with a traveling part; at least one through-hole defined in a top surface of the main body; at least one module guide configured to guide an installation position of a service part disposed above the main body; and a guide supporter configured to rotatably support the module guide inside the main body. The module guide may rotate between a first position within the main body and a second position protruding upward from the main body through the through-hole.

The movable robot may further include: at least one opening hole defined in the top surface of the main body, the at least one opening hole being spaced apart from the through-hole; at least one module coupling part coupled to a coupling member configured to restrict the service part; and a coupling part supporter configured to rotatably support the module coupling part inside the main body. The module coupling part may rotate between a third position within the main body and a fourth position facing an upper side of the main body through the opening hole.

The opening hole may have a size at which the coupling member passes.

One of the module guide and the guide supporter may be provided with a guide detent configured to temporarily fix the module guide, and the other of the module guide and the guide supporter may include: a first hook groove that is hooked with the guide detent when the module guide is disposed at the first position; and a second hook groove that is hooked with the guide detent when the module guide is disposed at the second position.

One of the module coupling part and the coupling part supporter may be provided with a coupling part detent configured to temporarily fix the module coupling part, and the other of the module coupling part and the coupling part supporter may include: a third hook groove that is hooked with the coupling part detent when the module coupling part is disposed at the third position; and a fourth hook groove that is hooked with the coupling part detent when the module coupling part is disposed at the fourth position.

The movable robot may further include a module support plate mounted on the top surface of the main body, the module support plate being configured to support a lower portion of the service part. A sub through-hole through which the module guide passes may be defined in the module support plate.

The movable robot may further include a module support plate mounted on the top surface of the main body, the module support plate being configured to support a lower portion of the service part. The module support plate may include: a sub through-hole through which the module guide passes; and a sub opening hole through which the coupling member passes.

The main body may include: a lower plate provided with the traveling part; a top plate spaced upward from the lower plate, the top plate being configured to define the top surface of the main body; and a housing configured to surround edges of the lower plate and the top plate. The through-hole and the opening hole may be vertically penetrated by the top plate.

At least one of the guide supporter or the coupling part supporter may be coupled to a bottom surface of the top plate.

The service part may include a module base configured to define a bottom surface thereof, and the module base may include: a guide insertion part into which the module guide is inserted; and a coupling hole which is spaced apart from the guide insertion part and through which the coupling member passes.

A coupling groove that is recessed downward from a top surface of the module base may be defined in the module base, and the coupling hole may pass from the coupling groove to the bottom surface of the module base.

The service part may further include a base cover configured to cover the module base at an upper side.

The details of one or more embodiments are set forth in the accompanying drawings and the description below. Other features will be apparent from the description and drawings, and from the claims.

DETAILED DESCRIPTION OF THE EMBODIMENTS

Hereinafter, detailed embodiments will be described in detail with reference to the accompanying drawings.

With respect to constituent elements used in the following description, suffixes "module" and "unit" are given only in consideration of ease in the preparation of the specification, and do not have or serve as different meanings. Accordingly, the suffixes "module" and "unit" may be used interchangeably.

When an element is "coupled" or "connected" to another element, it should be understood that a third element may be present between the two elements although the element may be directly coupled or connected to the other element. When an element is "directly coupled" or "directly connected" to another element, it should be understood that no element is present between the two elements.

Figure 1:
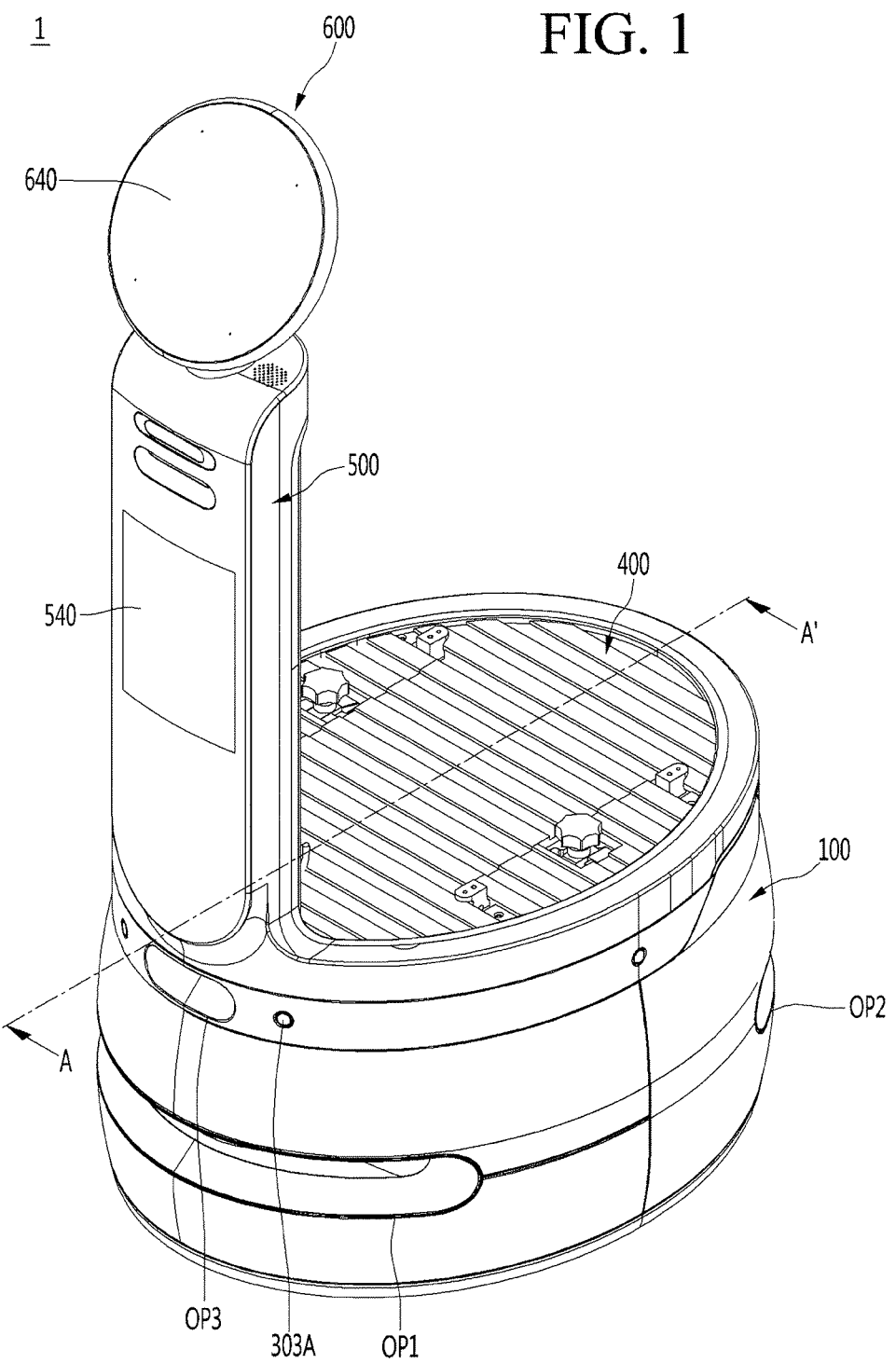
FIG. 1 is a perspective view of a movable robot according to an embodiment.
Figure 2:
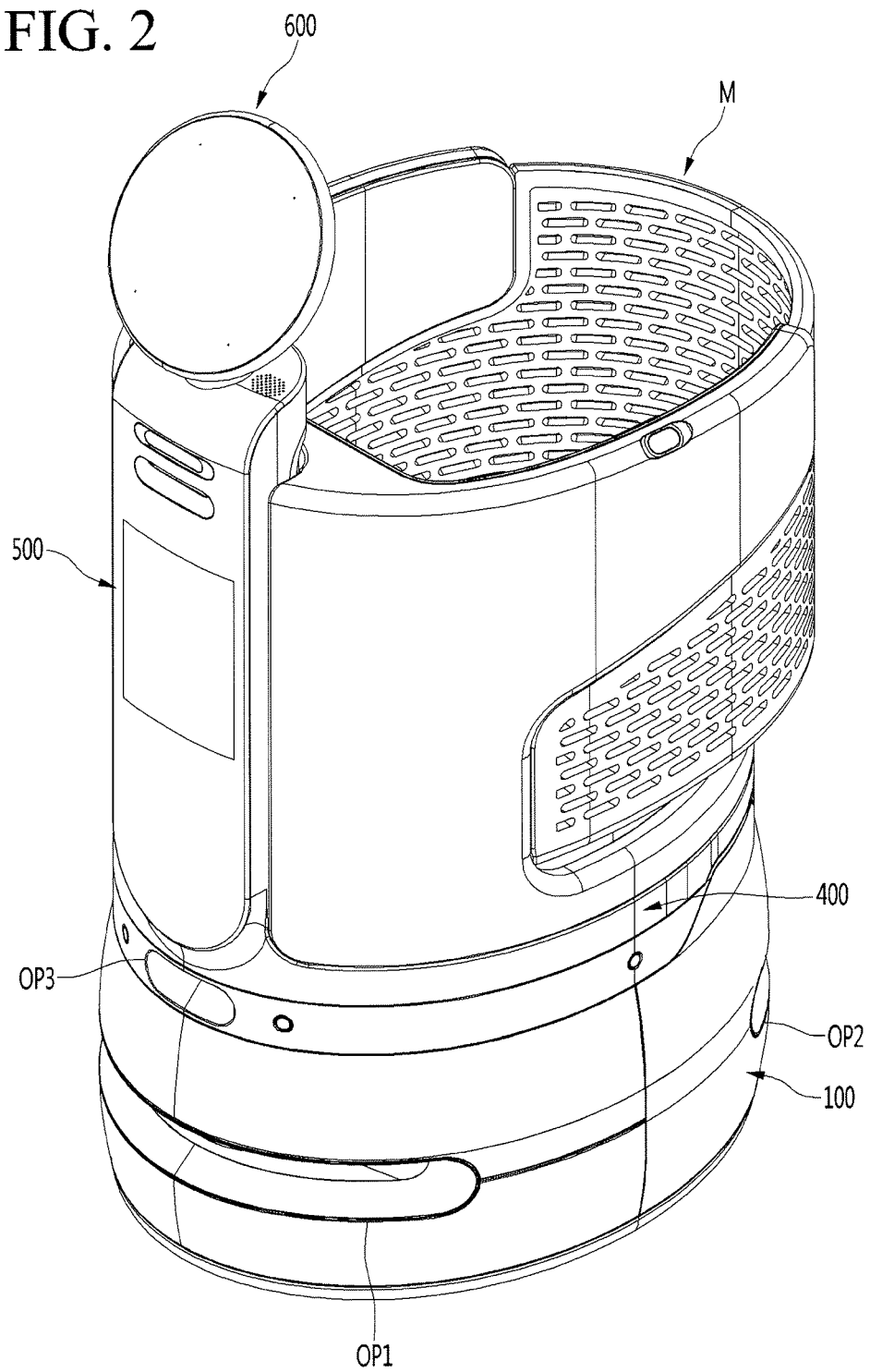
FIG. 2 is a perspective view illustrating a state in which a service module is mounted on the movable robot according to an embodiment.
Figure 3:
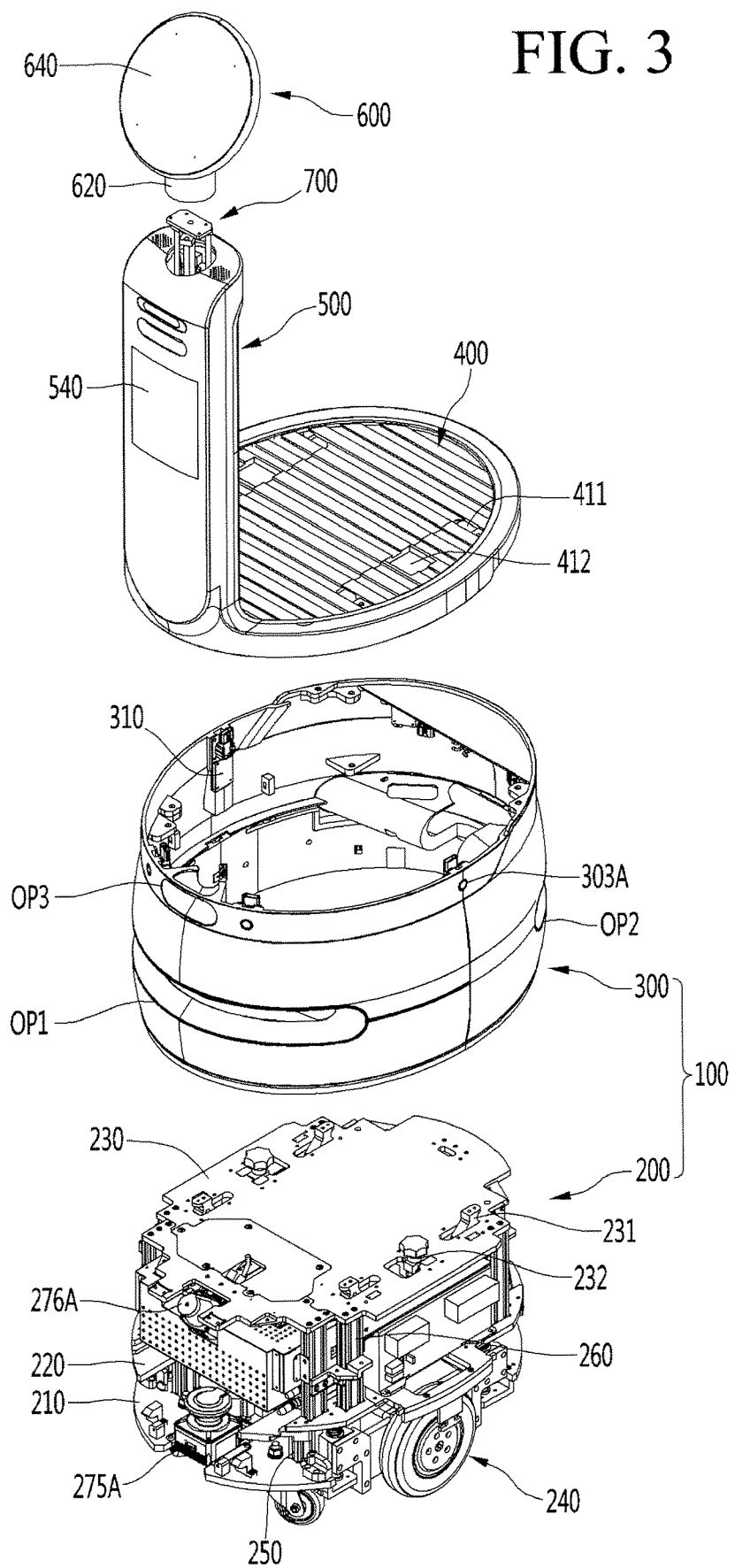
FIG. 3 is an exploded perspective view of the movable robot according to an embodiment.

FIG. 1 is a perspective view of a movable robot according to an embodiment, FIG. 2 is a perspective view illustrating a state in which a service module is mounted on the movable robot according to an embodiment, and FIG. 3 is an exploded perspective view of the movable robot according to an embodiment.

A movable robot 1 according to the embodiment includes a main body 100, a traveling part 240, a module support plate 400, display parts 500 and 600, and a rotation mechanism 700.

The main body 100 may constitute a body of the movable robot 1.

A longitudinal length of the main body 100 may be greater than a horizontal width of the main body 100. For example, a horizontal cross-section of the main body 100 may have an approximately oval shape.

The main body 100 may include an inner module 200 and a housing 300 surrounding the inner module 200.

The inner module 200 may be disposed inside the housing 300. The traveling part 240 may be provided below the inner module 200.

The inner module 200 may include a plurality of plates and a plurality of frames. In more detail, the inner module 200 may include a lower plate 210, an upper plate 220 disposed above the lower plate 210, and a top plate 230 disposed above the upper plate 220. Also, the inner module 200 may further include a plurality of lower supporting frames 250 and a plurality of upper supporting frames 260.

The lower plate 210 may define a bottom surface of the main body 100. The lower plate 210 may be referred to as a base plate. The lower plate 210 may be horizontal (i.e., may be provided in a horizontal plane). The traveling part 240 may be disposed on the lower plate 210.

The upper plate 220 may be spaced upward from the lower plate 210. The upper plate 220 may be referred to as a middle plate. The upper plate 220 may be horizontal. The upper plate 220 may be disposed between the lower plate 210 and the top plate 230 in the vertical direction.

The lower supporting frame 250 may be disposed between the lower plate 210 and the upper plate 220. The lower supporting frame 250 may be lengthily disposed vertically (i.e., have a length disposed in a vertical direction). The lower supporting frame 250 may support the upper plate 220 from a lower side of the upper plate 220.

The top plate 230 may define a top surface of the main body 100. The top plate 230 may be spaced upward from the upper plate 220.

The upper supporting frame 260 may be disposed between the upper plate 220 and the top plate 230. The upper supporting frame 260 may be lengthily disposed vertically (i.e., have a length disposed in a vertical direction). The upper supporting frame 260 may support the top plate 230 from a lower side of the top plate 230.

The housing 300 may define an outer circumferential surface of the main body 100. A space in which the inner module 200 is disposed may be defined in the housing 300. Top and bottom surfaces of the housing 300 may be opened.

The housing 300 may surround edges of the lower plate 210, the upper plate 220, and the top plate 230. In this case, an inner circumference of the housing 300 may contact the edge of each of the lower plate 210, the upper plate 220 and the top plate 230, but is not limited thereto.

A front opening part OP1 may be defined in a front portion of the housing 300. The front opening part OP1 may be opened forward (i.e., in a front direction). The front opening part OP1 may be defined lengthily (i.e., along its length) along a circumferential direction of the housing 300. A front lidar 275A may sense an obstacle or the like disposed in front of the movable robot 1 through the front opening part OP1 or may map a front region of the movable robot 1.

A rear opening part OP2 may be defined in a rear portion of the housing 300. The rear opening part OP2 may be opened backward (i.e., in a backward or rearward direction). The rear opening part OP2 may be lengthily (i.e., along its length) defined along the circumferential direction of the housing 300. A rear lidar 275B (see FIG. 4) may sense an obstacle or the like disposed behind the movable robot 1 through the rear opening part OP2 or may map a rear region of the movable robot 1. Also, a back cliff sensor 276B (see FIG. 4) may sense a bottom surface state behind the movable robot 1 through the rear opening part OP2.

An upper opening part OP3 may be defined in the front portion of the housing 300. The upper opening may be defined above the front opening part OP1. The upper opening part OP3 may be opened toward a front side or a front lower side. The cliff sensor 276A may sense a bottom surface state in front of the movable robot 1 through an upper opening part OP3.

A plurality of openings 303A may be defined in the housing 300. In more detail, the opening 303A may be formed in an upper portion of the housing 300. The plurality of openings 303A may be spaced apart from each other along the circumferential direction of the housing 300. Each of the ultrasonic sensors 310 may sense an object around the movable robot 1 through the openings 303A.

The housing 300 may include a material having first thermal conductivity, and the inner module 200 may include a material having second thermal conductivity greater than the first thermal conductivity. In more detail, at least one of the lower plate 210, the upper plate 220, the top plate 230, the lower supporting frame 250, or the upper supporting frame 260 include the material having the second thermal conductivity greater than the first thermal conductivity of the housing 300.

For example, the housing 300 may include an injection molded plastic material and the at least one of the lower plate 210, the upper plate 220, the top plate 230, the lower supporting frame 250, or the upper supporting frame 260 may include a metal material, such as aluminum.

As a result, while a heat generating component disposed on the inner module 200 smoothly releases heat by conduction, the housing 300 defining the outer appearance of the main body 100 may be prevented from being heated.

The traveling part 240 may travel (i.e., move) the movable robot 1. The traveling part 240 may be provided in a lower portion of the main body 100. In more detail, the traveling part 240 may be provided on the lower plate 210.

The module support plate 400 may be mounted on the top surface of the main body 100. The module support plate 400 has a horizontal plate shape, but is not limited thereto.

Like the main body 100, the module support plate 400 may have a longitudinal length greater than a horizontal width.

The module support plate 400 may support the service module M from the lower side. That is, the service module M may be seated on and supported by the module support plate 400.

The service module M may be detachably mounted on the module support plate 300.

In this case, the movable robot 1 according to an embodiment may be referred to as a "movable module", and the entire configuration including the mobile module 1 and the service module M may be referred to as a "movable robot". However, to avoid confusion in the description, these names are not used below.

The service module M may be a transport object carried by the movable robot 1, and the kind thereof is not limited. Therefore, different service modules M may be mounted on the same movable robot 1.

For example, the service module M may be a cart that is capable of containing goods. In this case, the cart-mounted movable robot 1 may be used in a mart, and may move so the user does not have to push the cart directly.

At least one of at least one module guide 231 that guides an installation position of the service module M or at least one module coupling part 232 coupled to the service module M may be provided on the top surface of the main body 100, i.e., the top plate 230.

The module guide 231 and the module coupling part 232 may protrude upward from the top plate 230.

The module guide 231 may pass through the sub through-hole 411 defined in the module support plate 400, guide the installation position of the service module M, and simultaneously prevent the service module M from shaking in the horizontal direction.

The module coupling part 232 may pass through a sub-opening hole 412 defined in the module support plate 400 and may be coupled to the service module M. Therefore, the service module M may be firmly mounted on the upper side of the module support plate 400.

The module guide 231 and the module coupling part 232 may be utilized as a handle when the movable robot 1 is transported.

The display parts 500 and 600 may be disposed above the front portion of the main body 100. The display parts 500 and 600 may be lengthily disposed vertically. A height HD (see FIG. 4) of each of the display parts 500 and 600 may be higher than that HB of the main body 100.

In more detail, the display parts 500 and 600 may include a body display part 500 and a head display part 600.

The body display part 500 may be integrated with the module support plate 400. In this case, the body display part 500 may extend upward from a front end of the module support plate 400. However, the body display part 500 and the module support plate 400 may be provided as separate members.

A height of the body display part 500 may be higher than that of the main body 100.

The body display part 500 may include a body display 540 provided on a front surface thereof. The body display 540 may serve as an output part for displaying an image or a picture. Simultaneously, the body display 540 may function as an input part including a touch screen to realize a touch input.

The body display part 500 may be disposed in front of the service module M mounted on the module support plate 400. In this case, a groove corresponding to a shape of the body display part 500 may be defined in the front portion of the service module M, and the body display part 500 may be fitted into the groove. That is, the body display part 500 may guide a mounting position of the service module M.

The head display part 600 may be disposed above the body display part 500. The head display part 600 may be rotatably connected to an upper portion of the body display part 500.

In more detail, the head display part 600 may include a neck housing 620 rotatably connected to the body display part 500. The rotation mechanism 700 may pass through the inside of the neck housing 620 to allow the head display part 600 to rotate.

The head display part 600 may include a head display 640 provided on a front surface thereof. The head display 640 may face a front side or a front upper side. The head display 640 may display an image or a picture depicting a human expression. As a result, the user may feel that the head display part 600 is similar to a human head.

The head display part 600 may rotate to a certain range (for example, about 180 degrees) horizontally with respect to a vertical rotation shaft like the human head.

The rotation mechanism 700 may allow the head display part 600 to rotate with respect to the body display part 500. The rotation mechanism 700 may include a rotation motor and a rotation shaft that rotates by the rotation motor. The rotation motor may be disposed in the body display part 500, and the rotation shaft may extend from the inside of the body display part 500 into the neck housing 620 so as to be connected to the head display part 600.

Figure 4:
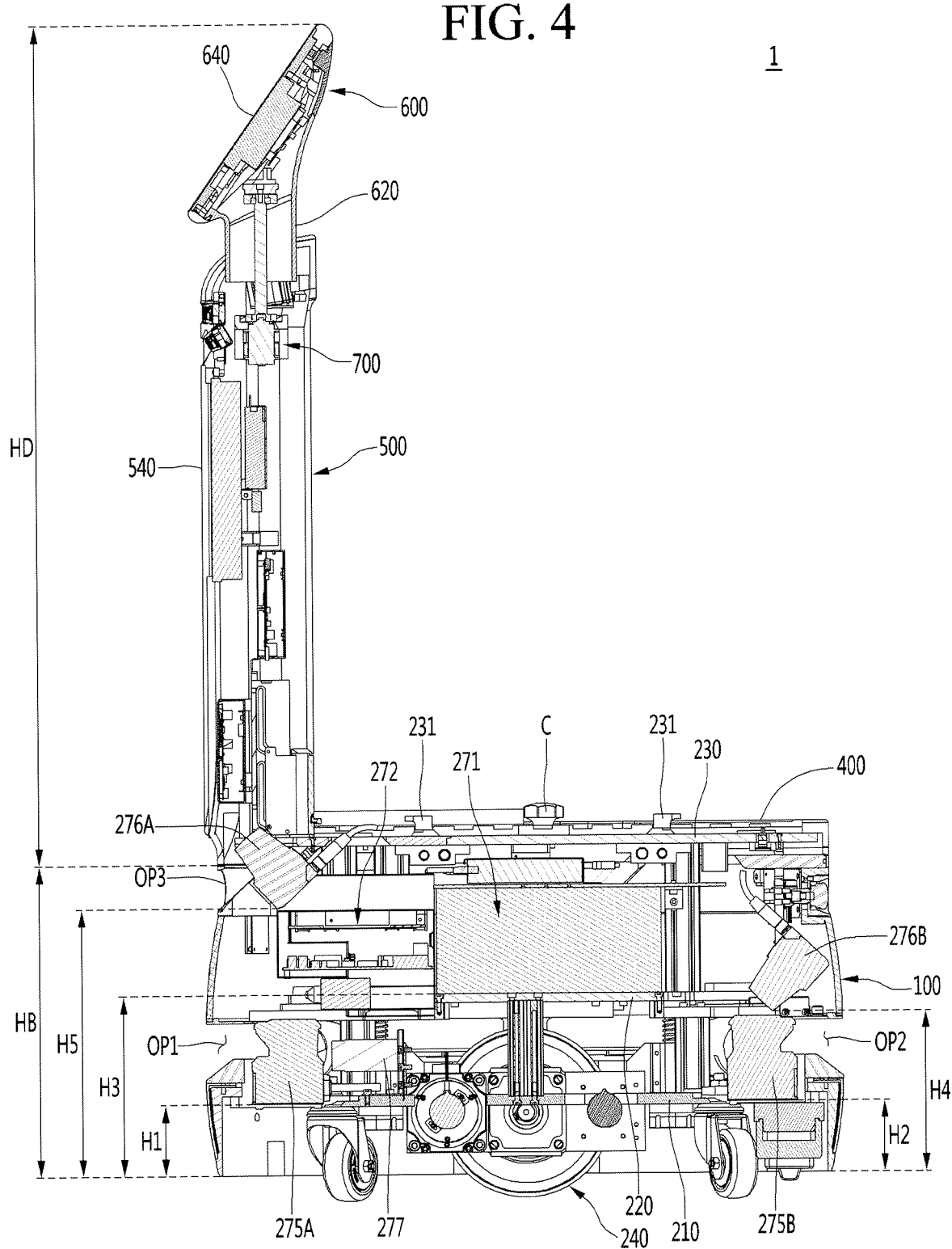
FIG. 4 is a cross-sectional view taken along line A-A' of FIG. 1.

FIG. 4 is a cross-sectional view taken along line A-A' of FIG. 1.

A battery 271 and a control box 272 may be built in the main body 100. Also, a front lidar 275A and a rear lidar 275B may be built (i.e., provided) in the main body 100.

The battery 271 may store electric power for operating the movable robot 1.

The battery 271 may be supported by the upper plate 220 of the inner module 200. The battery 271 may be disposed between the upper plate 220 and the top plate 230.

The battery 271 may be disposed eccentrically to the rear side in the main body 100.

Also, the display parts 500 and 600 may be supported by the top plate 230 of the inner module 200. The display parts 500 and 600 may be disposed above a front portion of the top plate 230. The body display part 500 may not overlap the battery 271 in the vertical direction.

Due the above-described configuration, a load of the battery 271 and loads of the body display part 500 and the head display part 600 may be balanced. Thus, the movable robot 1 may be prevented from being tilted forward or backward.

A control box 272 may be disposed in front of the battery 271. The control box 272 may be supported by the upper plate 220 of the inner module 200. The control box 272 may be disposed between the upper plate 220 and the top plate 230. At least a portion of the control box 272 may overlap the display parts 500 and 600 vertically.

The control box 272 may include a box-shaped boxing case and a controller provided inside the boxing case. A plurality of through-holes may be defined in the boxing case to dissipate heat inside the control box 272. The controller may include a PCB and control an overall operation of the movable robot 1.

Since the control box 272 is disposed in front of the battery 271, a load of the battery 271 may be provided eccentrically backward and a load of the control box 272 may be balanced. Thus, the movable robot 1 may be prevented from being tilted forward or backward.

The front lidar 275A and the rear lidar 275B may be provided at the front and rear portions of the main body 100, respectively.

A lidar is a sensor that is capable of sensing a distance to an object from the robot 1 and various physical properties by irradiating laser on a target, and a front lidar 275A and a rear lidar 275B may sense the surrounding objects, features, and the like. The controller of the control box 272 may receive information sensed by the front lidar 275A and the rear lidar 275B, perform 3D mapping based on the information, or control the traveling part 240 so that the movable robot 1 avoids an obstacle.

As described above, the front lidar 275A may sense information of the front region of the movable robot 1 through the front opening part OP1 defined in the front portion of the main body 100. The rear lidar 275B may sense information of the rear region of the movable robot 1 through the rear opening part OP2 defined in the rear portion of the main body 100.

At least a portion of the front lidar 275A may be disposed below the control box 272.

The front lidar 275A and the rear lidar 275B may be disposed at the same height within the main body 100.

In more detail, a vertical distance H1 from the bottom surface of the main body 100 to the front lidar 275A may be equal to a vertical distance H2 from the bottom surface of the main body 100 to the rear lidar 275B.

Also, each of the front lidar 275A and the rear lidar 275B may be disposed at a position lower than the battery 271 within the main body 100.

The front lidar 275A and the rear lidar 275B may be supported by the lower plate 210 of the inner module 200. The front lidar 275A and the rear lidar 275B may be disposed between the lower plate 210 and the upper plate 220.

In more detail, a vertical distance H3 from the bottom surface of the main body 100 to the battery 271 may be greater than a vertical distance H1 from the bottom surface of the main body 100 to the front lidar 275A. Also, a vertical distance H3 from the bottom surface of the main body 100 to the battery 271 may be greater than a vertical distance H2 from the bottom surface of the main body 100 to the rear lidar 275B.

As a result, a space in the main body 100 may be efficiently utilized as compared with a case in which the front lidar 275A and the rear lidar 275B are disposed at the same height as the battery 271. Therefore, the size of the main body 100 may be compact.

The main body 100 may include a cliff sensor 276A and a back cliff sensor 276B.

The cliff sensor 276A and the back cliff sensor 276B may be supported to be hung on the top plate 230 of the inner module 200. The cliff sensor 276A and the back cliff sensor 276B may be disposed between the upper plate 220 and the top plate 230.

The cliff sensor may sense a state of the bottom surface and whether a cliff (i.e., drop off) exists near the movable robot 1 by transmission and reception of infrared rays. That is, the cliff sensor 276A and the back cliff sensor 276B may sense a state of the bottom surface of the front and rear regions of the movable robot 1 and whether a cliff exists. The controller of the control box 272 may receive information sensed by the cliff sensor 276A and the back cliff sensor 276B and control the traveling unit 240 so that the movable robot 1 avoids the cliff on the base of the information.

As described above, the cliff sensor 276A may sense a bottom surface state in front of the movable robot 1 through the upper opening part OP3. The back cliff sensor 276B may sense a bottom surface state behind the movable robot 1 through the rear opening part OP2.

The cliff sensor 276A may be disposed above the front lidar 275A. The back cliff sensor 276B may be disposed above the rear lidar 276B.

At least a portion of the cliff sensor 276A may be disposed above the control box 272. The back cliff sensor 276B may be disposed behind the battery 271.

That is, the cliff sensor 276A may be disposed at a position higher than the back cliff sensor 276B in the main body 100.

More specifically, a vertical distance H4 from the bottom surface of the main body 100 to the cliff sensor 276A may be further than a vertical distance H5 from the bottom surface of the main body 100 to the back cliff sensor 276B.

As a result, a space in the main body 100 may be efficiently utilized as compared with a case in which the cliff sensor 276A is disposed in front of the control box 272. Therefore, the main body 100 may be compact with respect to a front direction and a rear direction.

The wire cut-off switch 277 may be built in the main body 100. The wire cut-off switch 277 may cut off power of the movable robot 1 to immediately stop the driving of the movable robot 1.

The wire cut-off switch 277 may be disposed behind the front lidar 275A. The wire cut-off switch 277 may be supported by the lower plate 210 of the inner module 200.

Figure 5:
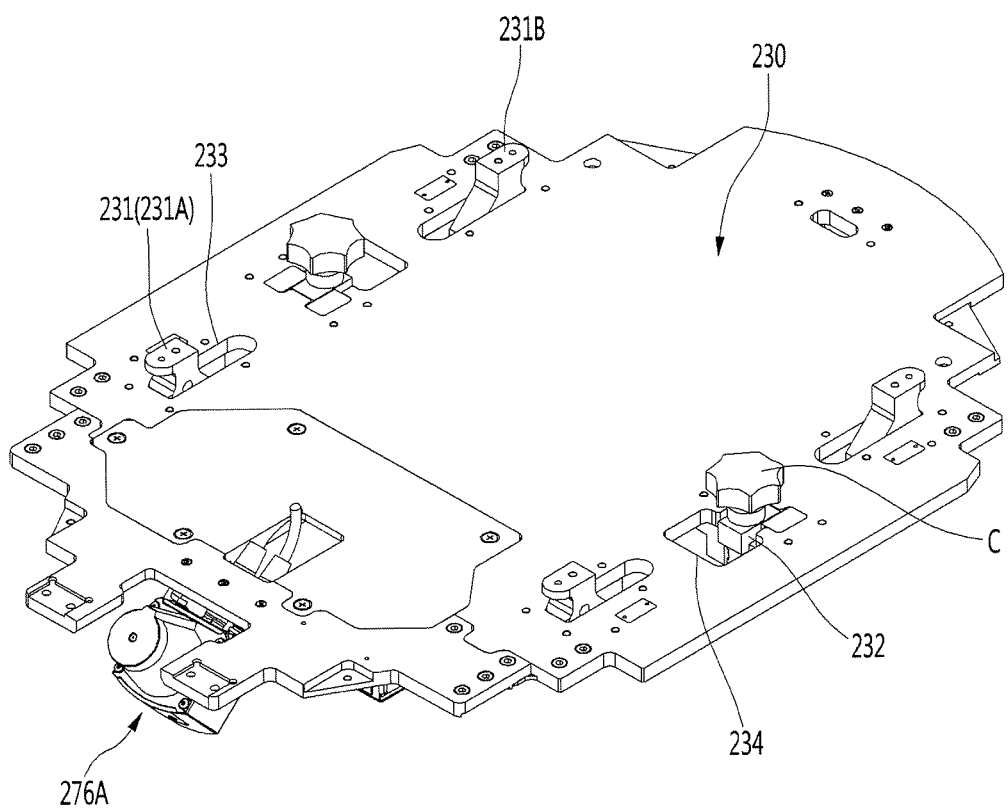
FIG. 5 is a perspective view of a top plate according to an embodiment.
Figure 6:
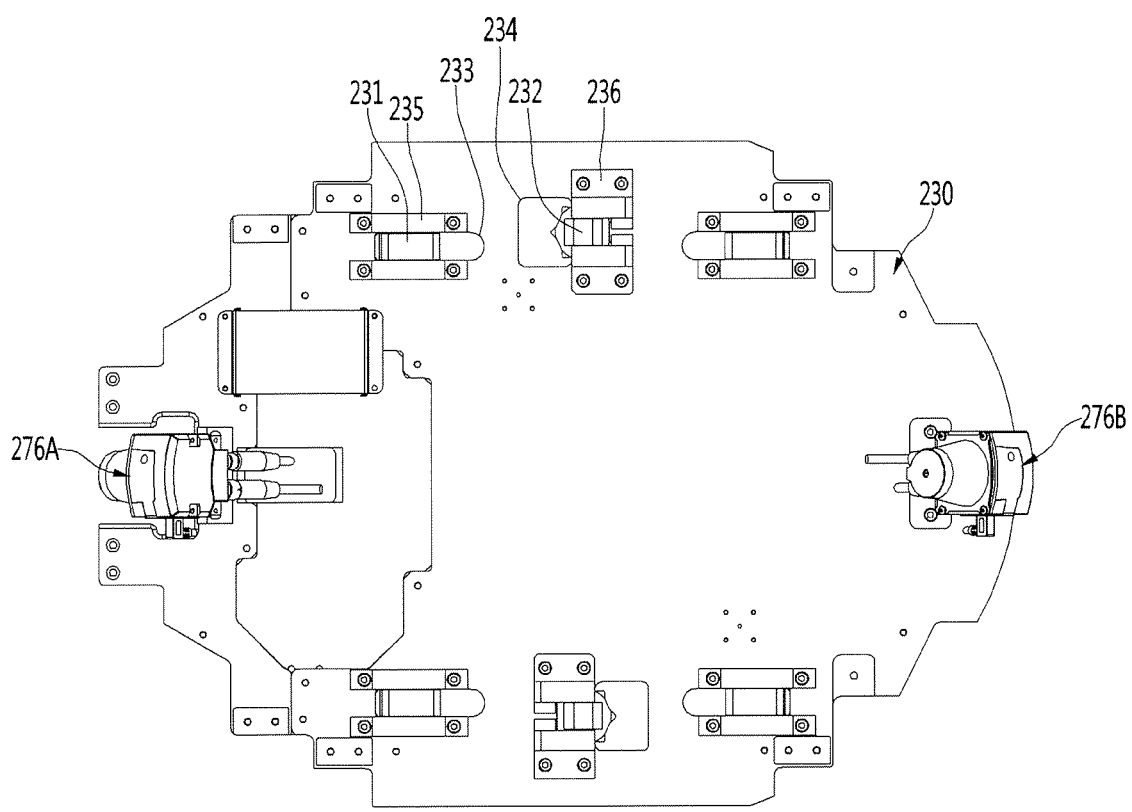
FIG. 6 is a bottom view of the top plate according to an embodiment.
Figure 7:
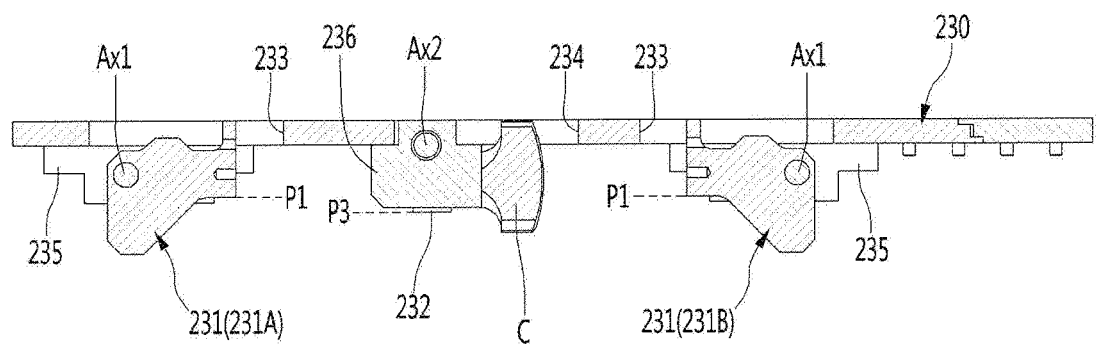
FIG. 7 is a cross-sectional view illustrating a state in which a module guide and a module coupling part rotate downward according to an embodiment.
Figure 8:
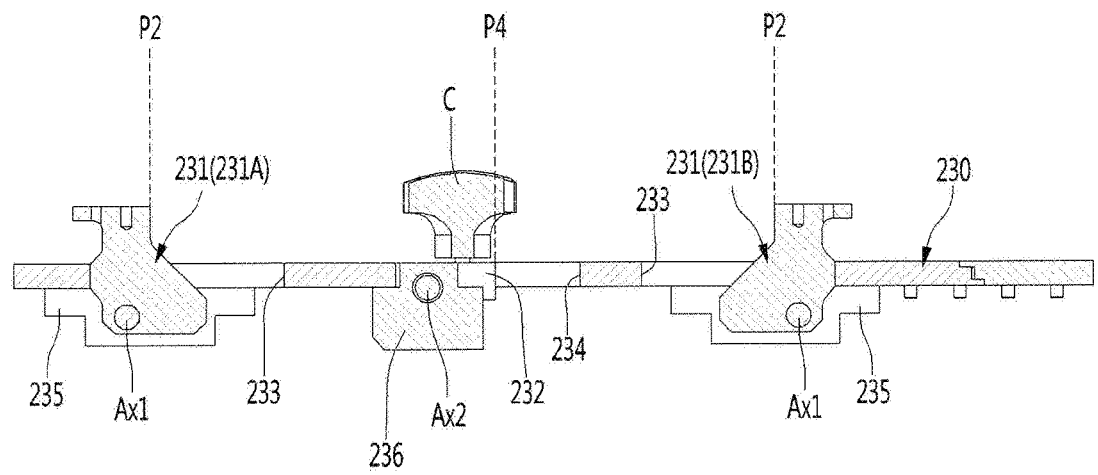
FIG. 8 is a cross-sectional view illustrating a state in which the module guide and the module coupling part rotate upward according to an embodiment.

FIG. 5 is a perspective view of the top plate according to an embodiment, FIG. 6 is a bottom view of the top plate according to an embodiment, FIG. 7 is a cross-sectional view illustrating a state in which the module guide 231 and the module coupling part 232 rotate downward according to an embodiment, and FIG. 8 is a cross-sectional view illustrating a state in which the module guide 231 and the module coupling part 232 rotate upward according to an embodiment.

The top plate 230 may be provided as a single plate member or provided by coupling a plurality of plate members to each other.

The cliff sensor 276A may be disposed at a front portion of the bottom surface of the top plate 230, and the back cliff sensor 276B may be disposed at a rear portion of the bottom surface of the top plate 230.

The top plate 230 may have a through-hole 233 that vertically passes therethrough. The module guide 231 may protrude upward from the top plate 230 through the through-hole 233.

Also, the bottom surface of the top plate 230 may be provided with a guide supporter 235 for rotatably supporting the module guide 231. That is, a rotation shaft Ax1 of the module guide 231 may be disposed under the top plate 230, i.e., inside the main body 100.

The guide supporter 235 may rotatably support the rotation shaft Ax1 of the module guide 231.

The rotation shaft Ax1 of the module guide 231 may be lengthily (i.e., may have a length) disposed in a horizontal direction. In more detail, the rotation shaft Ax1 of the module guide 231 may be lengthily disposed in the left right and right direction.

The module guide 231 may rotate upward or downward about the rotation shaft Ax1.

In more detail, the module guide 231 may rotate between a first position P1 in the main body 100 and a second position P2 protruding upward from the main body 100 through the through-hole 233. In more detail, the module guide 231 may rotate between the first position P1 under the top plate 230 and the second position P2 protruding upward from the top plate 230 through the through-hole 233.

In this case, the through-hole 233 may have a size at which the through-hole 233 does not interfere with the rotation module guide 231.

Also, an opening hole 234 may be defined in the top plate 230 to pass through vertically the top plate 230 and to be spaced apart from the through-hole 233. The module coupling part 232 may protrude upward from the top plate 230 through the opening hole 234.

The module coupling part 232 may be coupled to the service module M (see FIG. 2). In more detail, the module coupling part 232 may be coupled to the coupling member C which restricts the service module M.

Also, the bottom surface of the top plate 230 may be provided with a coupling part supporter 236 for rotatably supporting the module coupling part 232. That is, a rotation shaft Ax2 of the module coupling part 232 may be disposed under the top plate 230, i.e., inside the main body 100.

The coupling part supporter 236 may rotatably support the rotation shaft Ax2 of the module coupling part 232.

The rotation shaft Ax2 of the module coupling part 232 may be lengthily disposed (i.e., may have a length disposed) in the horizontal direction. In more detail, the shaft of rotation Ax2 of the module coupling part 232 may be lengthily disposed in the left direction and right direction.

The module coupling part 232 may rotate upward or downward about the rotation shaft Ax2.

In more detail, the module coupling part 232 may rotate between a third position P3 in the main body 100 and a fourth position P4 facing an upper side of the main body 100 through the opening hole 234. In more detail, the module coupling part 232 may rotate between the third position P3 of the lower side of the top plate 230 and the fourth position P4 facing the upper side of the top plate 230 through the opening hole 234.

In this case, the opening hole 234 may have a size at which the opening hole 234 does not interfere with the rotating module coupling part 232 and the coupling member C coupled to the module coupling part 232. Therefore, the coupling member C may be accommodated below the top plate 230, i.e., inside the main body 100 in a state of being coupled to the module coupling part 232.

When the movable robot 1 is used alone (i.e., without a service module M), the module guide 231 and the module coupling part 232 may not protrude upward from the top plate 230 and the module support plate 400 (see FIG. 3). Therefore, an object or the like may be placed on the top surface of the module support plate 400.

On the other hand, when the service module M (see FIG. 2) is mounted on the movable robot 1, the module guide 231 may protrude upward from the upper side of the top plate 230 through the through-hole 233 and the module support plate 400. The sub through-hole 411 (see FIG. 3) of the module support plate 400 may protrude upward from the module support plate 400 by passing through the through-hole 411 (see FIG. 3). Also, the module coupling part 232 may protrude upward from the upper side of the top plate 230 through the opening hole 234 and may pass through the sub-opening hole 412 (see FIG. 3) of the module support plate 400 to protrude upward from the module support plate 400.

In this case, a guide insertion part 961 (see FIG. 17) into which the module guide 231 is inserted may be provided in the bottom surface of the service module M. Thus, the installation position of the service module M may be not only guided but also fixed in the horizontal direction.

Also, a coupling hole 962A (see FIG. 17) through which the coupling member C passes may be defined in the bottom surface of the service module M. The coupling member C may be coupled to the module coupling part 232 by passing through the coupling hole 962A. As a result, the service module M may be fixed not only in the horizontal direction but also in the vertical direction.

The plurality of module guides 231 provided on the top plate 230 include a front module guide 231A provided at the front portion of the top plate 230 and a rear module guide 231B provided at the rear portion of the top plate 230.

The front module guide 231A may be disposed in front of the module coupling part 232, and the rear module guide 231B may be disposed behind the module coupling part 232. That is, the module coupling part 232 may be disposed between the front module guide 231A and the rear module guide 231B.

Figure 9:
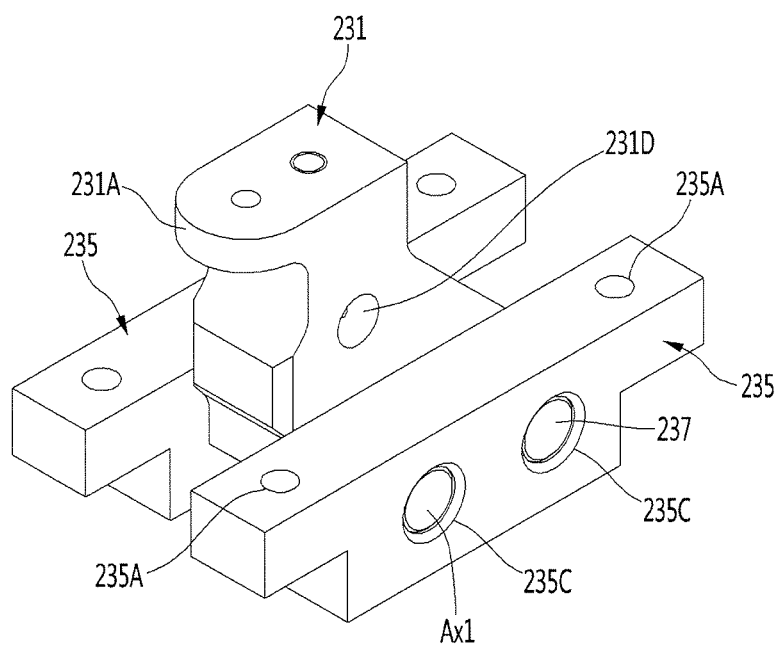
FIG. 9 is a perspective view of the module guide and a guide supporter according to an embodiment.
Figure 10:
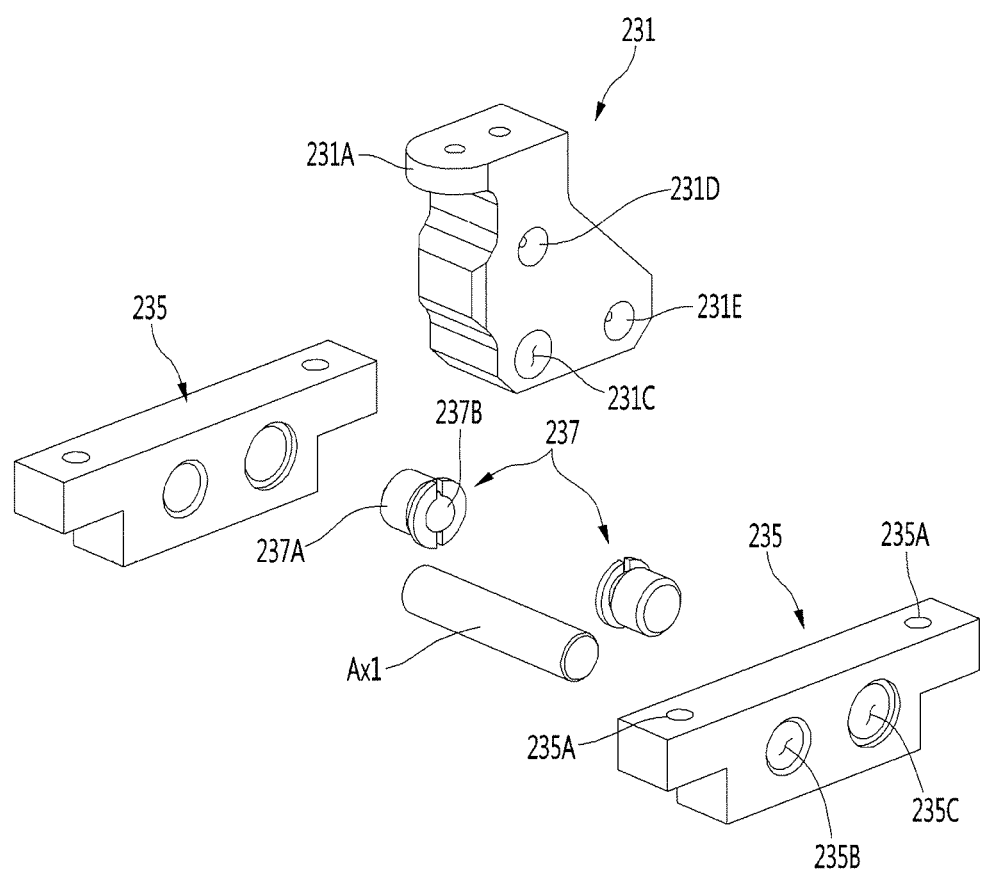
FIG. 10 is an exploded perspective view of the module guide and the guide supporter according to an embodiment.

FIG. 9 is a perspective view of the module guide 231 and the guide supporter 235 according to an embodiment, and FIG. 10 is an exploded perspective view of the module guide 231 and the guide supporter 235 according to an embodiment.

The module guide 231 may have a substantially block shape.

A handle part 231A may be disposed on the module guide 231. The handle part 231A may protrude in the horizontal direction from the module guide 231. The handle 231A may be disposed above the module support plate 400 (see FIG. 3) when the module guide 231 is, disposed at the second position P2 (see FIG. 8). Thus, the module guide 231 may be used as a handle of the movable robot 1 when the service module M (see FIG. 2) is not mounted on the movable robot 1.

The guide supporter 235 may be provided in a pair, which are disposed opposite to each other with respect to the module guide 231. In this case, the pair of guide supporters 235 may be spaced apart from each other in a longitudinal direction of the rotation shaft Ax1 of the module guide 231.

At least one plate coupling hole 235A coupled to the bottom surface of the top plate 230 (see FIG. 6) may be defined in the top surface of each of the guide supporters 235. In more detail, a separate coupling member such as a screw may be coupled to the plate coupling hole 235A by passing through the top plate 230. As a result, each of the guide supporters 235 may be fixed to the bottom surface of the top plate 230.

The rotation shaft Ax1 of the module guide 231 may be rotatably supported by the pair of guide supporters 235.

In more detail, the module guide 231 may be provided with a rotation shaft through-hole 231C through which the rotation shaft Ax1 passes.

The rotation shaft through-hole 231C may be defined in a lower portion of the module guide 231. The rotation shaft through-hole 231C may be defined to pass through the module guide 231 in the horizontal direction. A rotation shaft insertion hole 235B may be defined to pass through the guide supporter 235 in the horizontal direction at a position corresponding to the rotation shaft through-hole 231C.

One end of the rotation shaft Ax1 passing through the rotation shaft through-hole 231C of the module guide 231 is inserted into the rotation shaft insertion hole 235B defined in one guide supporter 235, and the other end of the rotation shaft Ax1 may be inserted into the rotation shaft insertion hole 235B defined in the other guide supporter 235.

However, this embodiment is not limited thereto, and the rotation shaft Ax1 and the module guide 231 may be integrated with each other.

One of the module guide 231 and the guide supporter 235 may be provided with a guide detent 237 for temporarily fixing the module guide 231 or the guide supporter 235. Also, the other of the module guide 231 and the guide supporter 235 may be provided with hook grooves 231D and 231E to which the guide detent 237 is hooked.

Hereinafter, a case in which the guide detent 237 is mounted on the guide supporter 235, and the hook grooves 231D and 231E are defined in the module guide 231 will be described as an example.

The guide detent 237 includes a detent body 237A mounted on the guide supporter 235, a detent ball 237B provided on the detent body 237A and hooked with the module guide 231, and a spring built in the detent body 237A and providing elastic force to the detent ball 237B. Since the configuration of the detent is a well-known technique, detailed description thereof will be omitted.

The guide supporter 235 may have a detent mounting hole 235C in which the guide detent 237 is mounted. In more detail, a detent body 237A of the guide detent 237 may be fitted to be mounted in the detent mounting hole 235C.

The detent mounting hole 235C may be defined to pass through the guide supporter 235 horizontally. The detent mounting hole 235C may be spaced apart from the rotation shaft insertion hole 235B. The dent mounting hole 235C may be provided in plurality.

The module guide 231 may be provided with hook grooves 231D and 231E that are hooked on the guide detent 237. The hook grooves 231D and 231E may be defined in both side surfaces of the module guide 231.

In more detail, the first guide groove 231D and the second guide groove 231E may be defined in the module guide 231. The first hook groove 231D and the second hook groove 231E may be spaced apart from each other. The first hook groove 231D and the second hook groove 231E may be defined in both side surfaces of the module guide 231, respectively.

The first hook groove 231D may be defined at a position higher than the second hook groove 231E. For example, the first hook groove 231D may be defined above the rotation shaft through-hole 231C, and the second hook groove 231E may be disposed in front of or behind the rotation shaft through-hole 231C.

The first hook groove 231D and the second hook groove 231E may be defined to correspond to a shape of the detent ball 237B of the guide detent 237.

When the module guide 231 is disposed at the first position P1 (see FIG. 7), the guide detent 237 may be hooked with the first hook groove 231D. When the module guide 231 is disposed at the second position P2 (see FIG. 8), the guide detent 237 may be hooked with the second hook groove 231E.

That is, when the module guide 231 is disposed below the module support plate 400 (see FIG. 3), the guide detent 237 may be hooked with the first hook groove 231D of the module guide 231. As a result, the module guide 231 may be temporarily fixed at the first position P1.

Also, when a portion of the module guide 231 protrudes to the upper side of the module support plate 400 (see FIG. 3), the guide detent 237 may be hooked with the second hook groove 231E of the module guide 231. As a result, the module guide 231 may be temporarily fixed at the second position P2.

In more detail, when the module guide 231 is temporarily fixed at the first position P1, the detent ball 237B may be hooked with the first hook groove 231D. In this case, when external force by which the module guide 231 rotates upward is applied to the module guide 231, the spring connected to the detent ball 237B may be compressed, and the detent ball 237B may get out of the first hook groove 231D. Thereafter, when the module guide 231 rotates upward to reach the second position P2, the detent ball 237B may be hooked with the second hook groove 231E by the elastic force of the spring. As a result, the module guide 231 may be temporarily fixed at the second position P2.

On the contrary, when the module guide 231 is temporarily fixed at the second position P2, the detent ball 237B may be hooked with the second hook groove 231E. In this case, when the external force by which the module guide 231 rotates downward is applied to the module guide 231, the spring connected to the detent ball 237B may be compressed, and the detent ball 237B may get out of the second hook groove 231E. Thereafter, when the module guide 231 rotates downward to reach the first position P1, the detent ball 237B may be hooked with the first hook groove 231D by the elastic force of the spring. As a result, the module guide 231 may be temporarily fixed at the first position P1.

Figure 11:
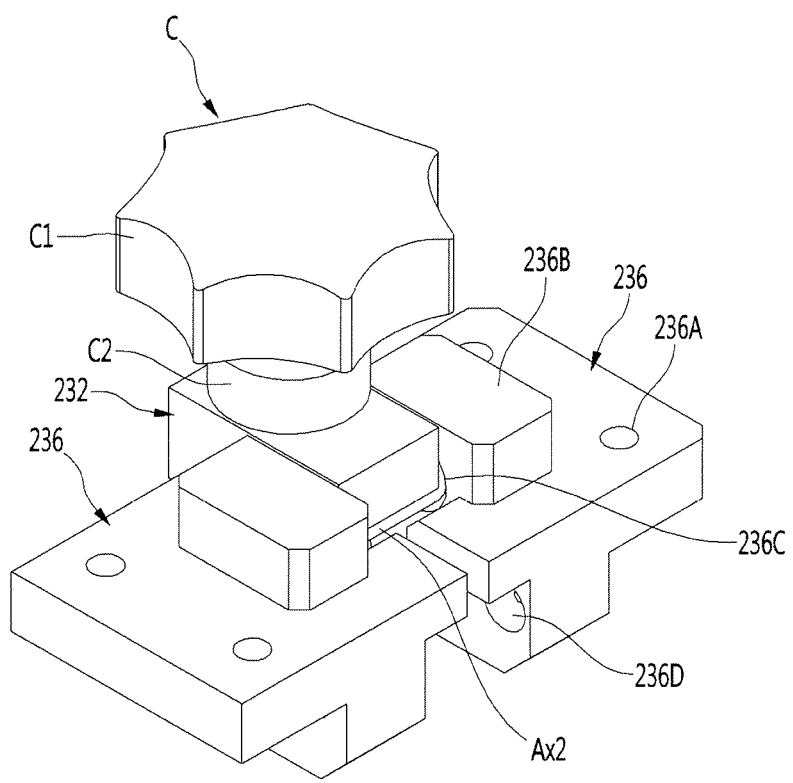
FIG. 11 is a perspective view of a module coupling part and a coupling part supporter according to an embodiment.
Figure 12:
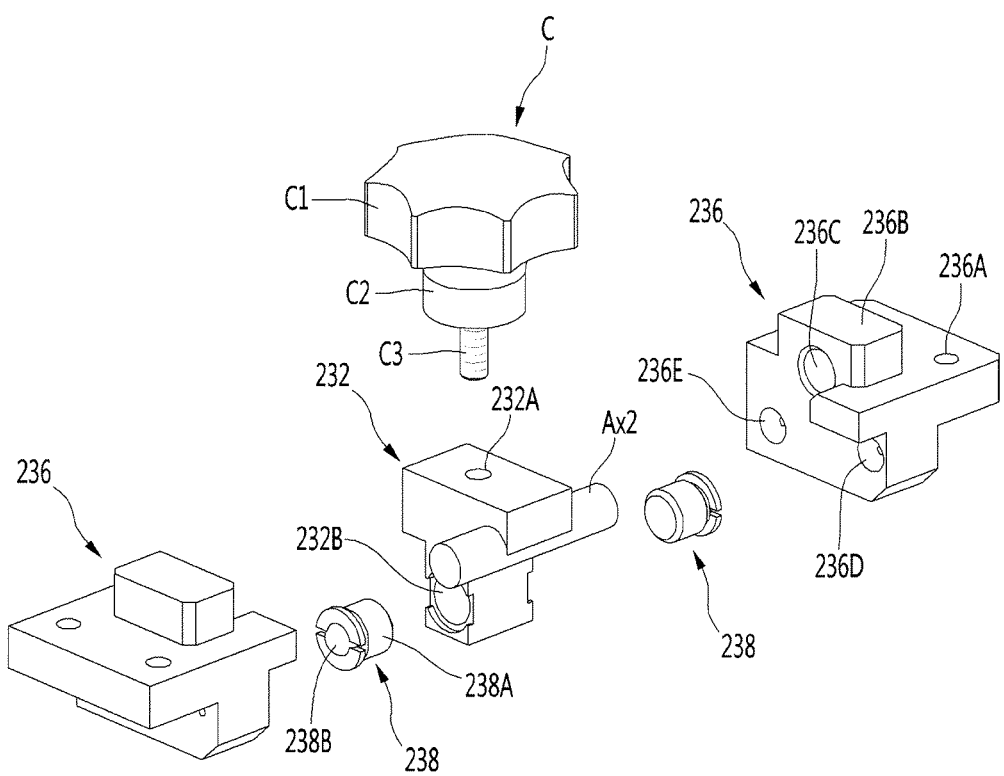
FIG. 12 is an exploded perspective view of the module coupling part and the coupling part supporter according to an embodiment.

FIG. 11 is a perspective view of the module coupling part 232 and the coupling part supporter 236 according to an embodiment, and FIG. 12 is an exploded perspective view of the module coupling part 232 and the coupling part supporter 236 according to an embodiment.

The module coupling part 232 may have a substantially block shape.

A coupling groove 232A to which the coupling member C is coupled may be defined in the module coupling part 232. The coupling groove 232A may be recessed downward from a top surface of the module coupling part 232. A female screw thread corresponding to the male screw thread of the coupling member C may be disposed on an inner circumference of the hook groove 232A.

The coupling member C may be coupled to the coupling groove 232A of the module coupling part 232. In more detail, the coupling member C includes a head part C1, a body part C2 extending downward from the head part C1, and a coupling part C3 extending downward from the main body part C2.

The head part C1 may has a size greater than that of each of the main body part C2 and the coupling part C3. The operator may hold the head part C1 to allow the coupling member C to rotate, and thus, the coupling member C may be coupled to the module coupling part 232 or separated from the module coupling part 232. That is, the coupling part C3 of the coupling member C may be coupled to the coupling groove 232A of the module coupling part 232.

The coupling part supporter 236 may be provided in a pair, which are disposed opposite to each other with respect to the module coupling part 232. In this case, the pair of coupling part supporters 236 may be spaced apart from each other with in the longitudinal direction of the rotation shaft Ax2 of the module coupling part 232.

At least one plate coupling hole 236A coupled to the bottom surface of the top plate 230 (see FIG. 6) may be defined in the top surface of each of the coupling part supporters 236. In more detail, a separate coupling member, such as a screw, may be coupled to the plate coupling hole 236A by passing through the top plate 230. As a result, each of the coupling part supporters 236 may be fixed to the bottom surface of the top plate 230.

The rotation shaft Ax2 of the module coupling part 232 may be rotatably supported by the pair of coupling part supporters 236.

In more detail, the module coupling part 232 may be provided with the rotation shaft Ax2, and the coupling part supporter 236 may have a rotation shaft insertion hole 236C into which an end of the rotation shaft Ax2 is inserted.

The rotation shaft Ax2 may be integrated with the module coupling part 232. The rotation shaft Ax2 may be provided in an upper portion of the module coupling part 232.

The rotation shaft insertion groove 236C may be defined in an upper portion of the coupling part supporter 236. In more detail, a protrusion 236B of which a portion of a top surface protrudes upward may be disposed on the coupling part supporter 236, and at least a portion of the rotation shaft insertion groove 236c may be defined in the protrusion 236B.

The rotation shaft insertion groove 236C may be disposed on an inner surface of the coupling part supporter 236.

One end of the rotation shaft Ax2 provided in the module coupling part 232 may be inserted into the rotation shaft insertion groove 236C defined in the one coupling part supporter 236, and the other end of the rotation shaft Ax2 may be inserted into the rotation shaft insertion groove 236C defined in the other coupling part supporter 236.

However, this embodiment is not limited thereto, and a rotation shaft through-hole through which the rotation shaft Ax2 passes may be defined in the module coupling part 232.

One of the module coupling part 232 and the coupling part supporter 236 may be provided with a coupling part detent 238 for temporarily fixing the module coupling part 232. Also, the other one of the module coupling part 232 and the coupling part supporter 236 may be provided with hook grooves 236D and 236E hooked with the coupling part detent 238.

Hereinafter, a case in which the coupling part detent 238 is mounted on the module coupling part 232, and the hook grooves 236D and 236E are defined in the coupling part supporter 236 will be described as an example.

The coupling part detent 238 includes a detent body 238A mounted on the module coupling part 232, a detent ball 238B provided on the detent body 238A and hooked with the coupling part supporter 236, and a spring built in the detent body 238A and providing elastic force to the detent ball 238B. Since the configuration of the detent is a well-known technique, detailed description thereof will be omitted.

A detent mounting hole 232B in which the detent part detent 238 is mounted may be defined in the module coupling part 232. In more detail, the detent body 238A of the coupling part detent 238 may be fitted to be mounted in the detent mounting hole 232B. In more detail, a pair of coupling part detents 238 facing each other may be fitted to one side and the other side of the detent mounting hole 232B, respectively.

The detent mounting hole 232B may be defined to pass through the module coupling part 232 horizontally. The detent mounting hole 232B may be defined in a lower portion of the module coupling part 232.

The coupling part supporter 236 may have hook grooves 236D and 236E that are hooked with the coupling part detent 238. The hook grooves 236D and 236E may be defined in a lower portion of the coupling part supporter 236. Each of the hook grooves 236D and 236E may be defined at a height lower than that of the rotation shaft insertion groove 236C in the coupling part supporter 236.

In more detail, a third hook groove 236D and a fourth hook groove 236E may be defined in the coupling part supporter 236. The third hook groove 236D and the fourth hook groove 236E may be spaced apart from each other. The third hook groove 236D and the fourth hook groove 236E may be defined in the inner side surface of the coupling part supporter 236.

The third hook groove 236D and the fourth hook groove 236E may be defined (i.e., provided) at the same height as each other.

The third hook groove 236D and the fourth hook groove 236E may be defined to correspond to a shape of the detent ball 238B of the coupling part detent 238.

When the module coupling part 232 is disposed at the third position P3 (see FIG. 7), the coupling part detent 238 may be hooked with the third hook groove 236D. When the module coupling part 232 is disposed at the fourth position P4 (see FIG. 8), the coupling part detent 238 may be hooked with the fourth hook groove 236E.

That is, when the coupling member C coupled to the module coupling part 232 is disposed below the module support plate 400 (see FIG. 3), the coupling part detent 238 may be hooked with the third hook groove 236D of the coupling part supporter 236. As a result, the module coupling part 232 may be temporarily fixed at the third position P3.

Also, when a portion of the coupling member C coupled to the module coupling part 232 protrudes upward from the module support plate 400 (see FIG. 3), the coupling part detent 238 may be hooked with the fourth hook groove 236E of the coupling part supporter 236. Thus, the module coupling part 232 may be temporarily fixed at the fourth position P4.

In more detail, when the module coupling part 232 is temporarily fixed at the third position P3, the detent ball 238B may be hooked with the third hook groove 236D. In this case, when the external force of the module coupling part 232 rotates upward is applied to the module coupling part 232, the spring connected to the detent ball 238B may be compressed, and the detent ball 238B may get out of the third hook groove 236D. Thereafter, when the module coupling part 232 rotates upward to reach the fourth position P4, the detent ball 238B may be hooked with the fourth hook groove 236E by the elastic force of the spring. Thus, the module coupling part 232 may be temporarily fixed at the fourth position P4.

On the contrary, when the module coupling part 232 is temporarily fixed at the fourth position P4, the detent ball 238B may be hooked with the fourth hook groove 236E. In this case, when the external force by which the module coupling part 232 rotates downward is applied to the module coupling part 232, the spring connected to the detent ball 238B may be compressed, and the detent ball 238B may get out of the fourth hook groove 236E. Thereafter, when the module coupling part 232 rotates downward to reach the third position P3, the detent ball 238B may be hooked with the third hook groove 236D by the elastic force of the spring. Thus, the module coupling part 232 may be temporarily fixed at the third position P3.

Figure 13:
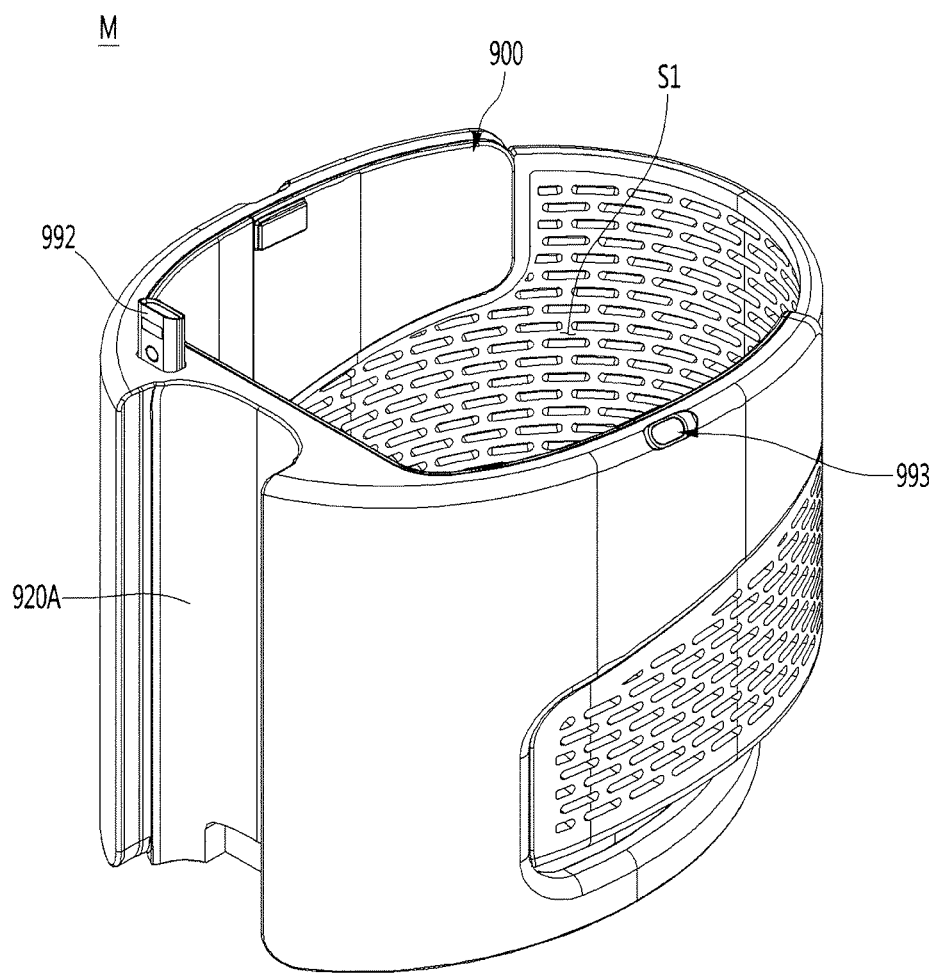
FIG. 13 is a perspective view of the service module according to an embodiment.
Figure 14:
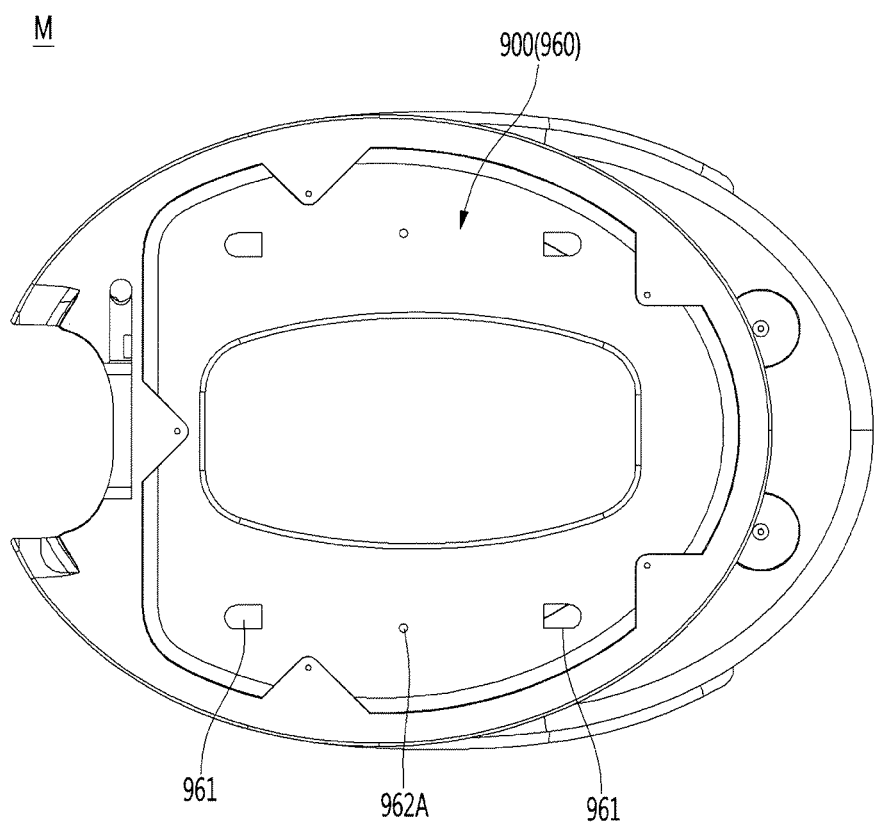
FIG. 14 is a bottom view of the service module according to an embodiment.

FIG. 13 is a perspective view of the service module according to an embodiment, and FIG. 14 is a bottom view of the service module according to an embodiment.

The service module M may include a main body 900 having an accommodation space S1 in which an article is accommodated. A top surface of the accommodation space S1 may be opened, and the user may easily put an article or the like into the accommodation space S1.

A guide groove 920A that is recessed backward may be defined in a front surface of the main body 900. The guide groove 920A may be lengthily (i.e., have a length) defined vertically from a top surface to a bottom surface of the main body 900. The guide groove 920A may correspond to the shape of the body display part 500 (see FIG. 2) described above. When the service module M is mounted on the movable robot 1, at least a portion of the body display part 500 may be fitted into the guide groove 920A. Thus, the mounting position of the service module M may be guided by the body display part 500.

At least one guide insert part 961 and at least one coupling hole 962A may be defined in the bottom of the main body 900. The guide insertion part 961 and the coupling hole 962A may be spaced apart from each other.

The guide insertion part 961 may be defined by be recessed upward from the bottom surface of the main body 900.

A module guide 231 (see FIG. 5) disposed on the top surface of the main body 100 of the moving module 1 may be inserted into the guide insertion part 961. In more detail, the module guide 231 may be inserted into the guide insertion part 961 through the sub through-hole 411 defined in the module support plate 400 (see FIG. 3).

The coupling hole 962A may be defined to pass through the bottom surface of the main body 900 vertically.

The coupling hole 962A may be coupled to the module coupling part 232 (see FIG. 5) disposed on the top surface of the main body 100 of the mobile module 1. In more detail, the module coupling part 232 may face the coupling hole 962A through the sub opening hole 412 defined in the module support plate 400 (see FIG. 3). In this case, the coupling member C (see FIG. 5) may pass through the coupling hole 962A and then pass through the sub opening hole 412 so as to be coupled to the module coupling part 232.

The service module M may include a scanner 992 mounted on the main body 900.

The scanner 992 may be disposed to face a front side. In more detail, the scanner 992 may be provided to protrude upward from the top surface of the front portion of the main body 900. However, this embodiment is not limited thereto, and the mounting position of the scanner 992 may vary as necessary.

The scanner 992 may read a preset type of data information. For example, the scanner 992 may read at least one data information of a bar code and a Quick response code.

For example, the movable robot 1 may be used in a mart, and the service module M may function as a cart for storing goods. In this case, when the user brings the bar code displayed on the article to the scanner 992, the name and price information of the article may be recognized.

The service module M may include a slam module 993 mounted on the main body 900. The slam module 993 may include a camera. The slam module 993 may be a vision sensor or an optical sensor.

The movable robot may perform a simultaneous localization and mapping (SLAM) operation by using the information sensed by the slam module 993. That is, the traveling movable robot 1 may measure its own location using the information sensed by the slam module 993 and simultaneously create a map of the surrounding environment.

The slam module 993 may be installed on an upper portion of the main body 900.

The slam module 993 may be provided in plurality. For example, the service module M may include a pair of slam modules 993 respectively provided on left side and the right sides of the main body 900.

Figure 15:
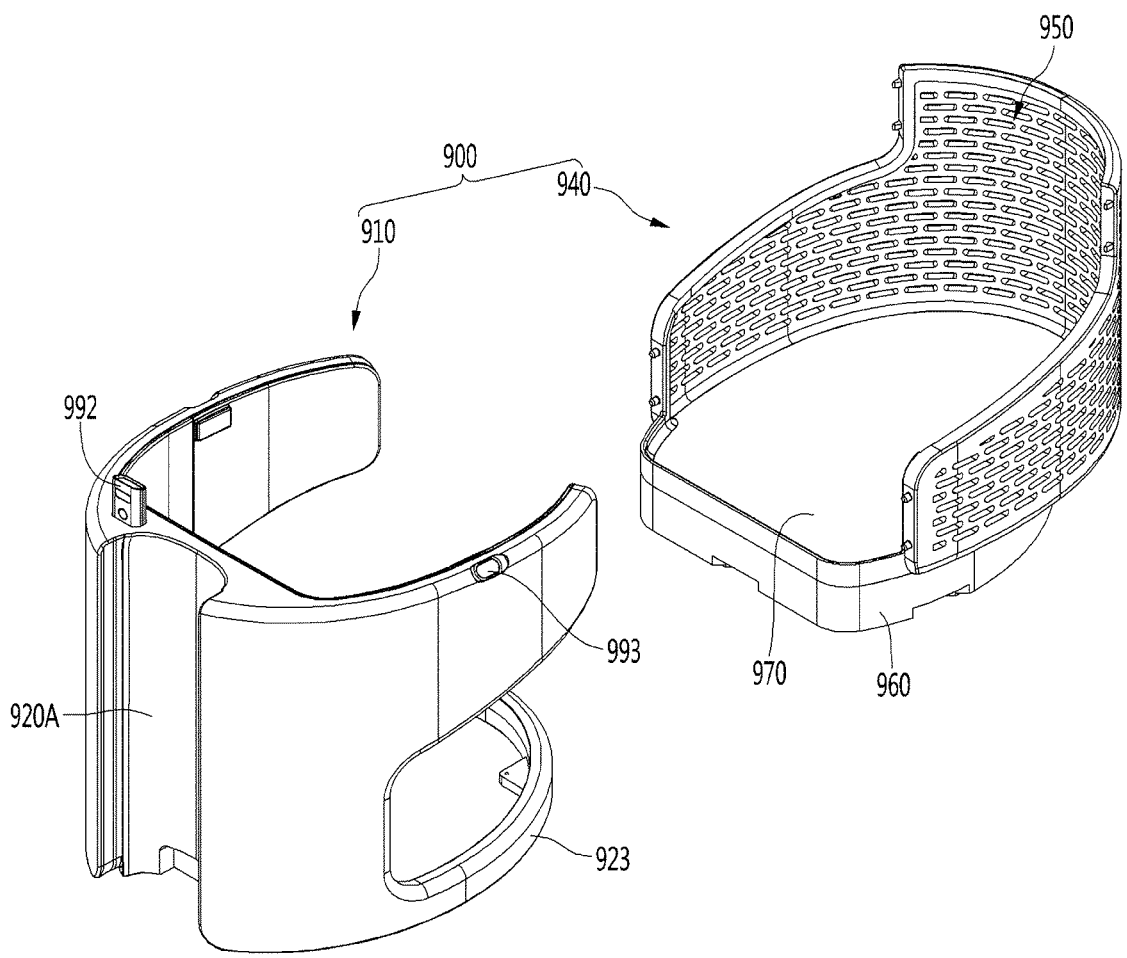
FIG. 15 is an exploded perspective view of a main body according to an embodiment.
Figure 16:
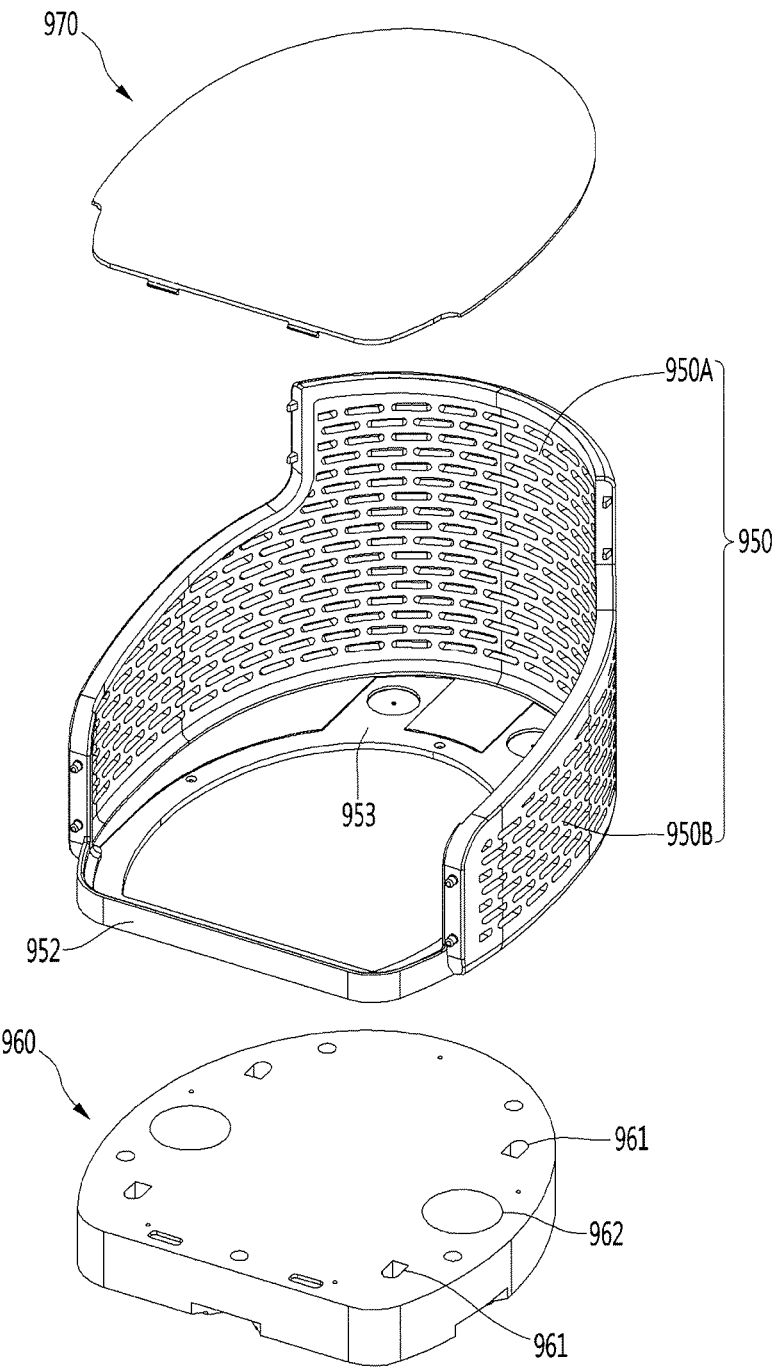
FIG. 16 is an exploded perspective view of a rear module according to an embodiment.
Figure 17:
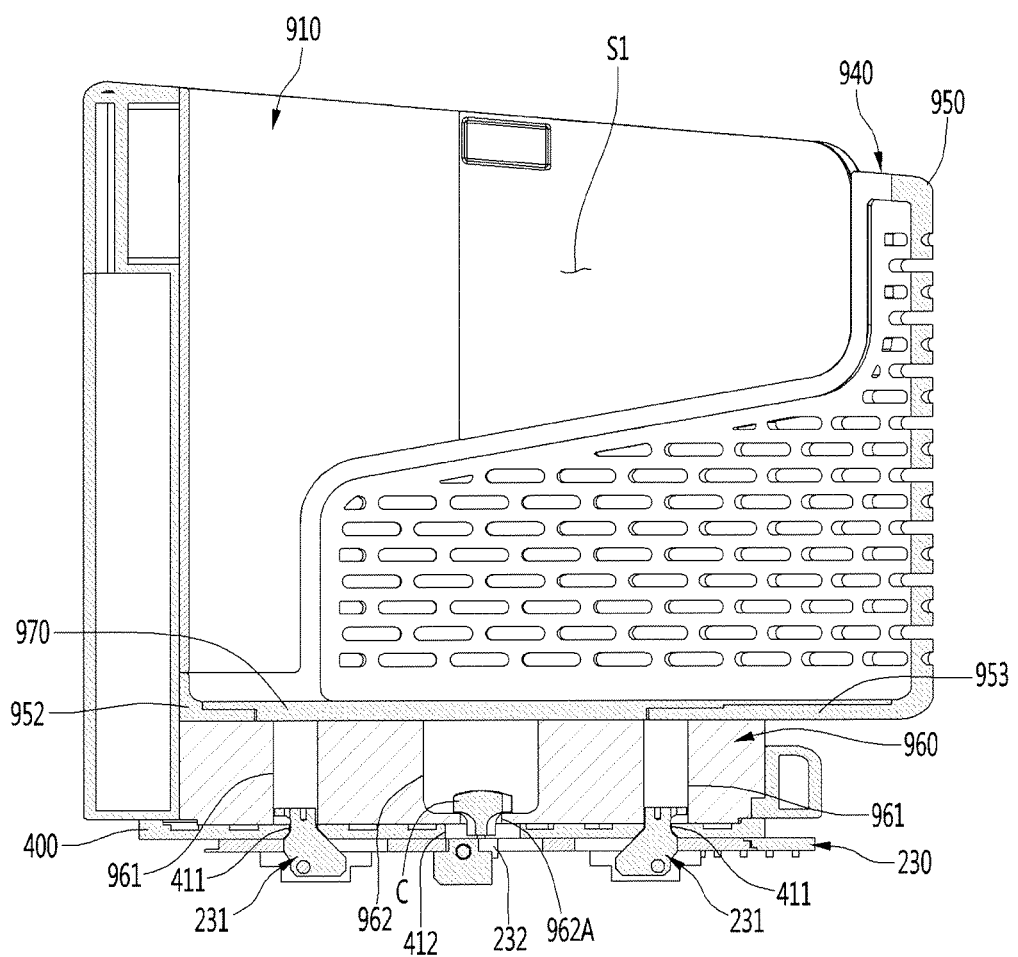
FIG. 17 is a cross-sectional view illustrating a state in which the service module is mounted on the movable robot according to an embodiment.

FIG. 15 is an exploded perspective view of the main body 900 according to an embodiment, FIG. 16 is an exploded perspective view of a rear module 940 according to an embodiment, and FIG. 17 is a cross-sectional view illustrating a state in which the service module M is mounted on the movable robot 1 according to an embodiment.

The main body 900 may include a front module 910 and a rear module 940.

The scanner 992 and the slam module 993, which are described above, may be mounted on the front module 910. Also, the guide groove 920A described above may be defined in a front surface of the front module 910.

The rear module 940 may be mounted on the front module 910 at a rear side of the front module 910. The rear module 940 may define an accommodation space S1 of the service module M together with the front module 910.

The rear module 640 may include a basket 950, a module base 960, and a base cover 970.

The basket 950 may include a rear basket 950A and a pair of side baskets 950B extending forward from both edges of the rear basket 950A.

The rear basket 950A may define a rear appearance of the service module M. Each of the side baskets 950B may define an appearance of a lower portion of a side of the service module M.

A height of the rear basket 950A may be higher than that of the side basket 950B. A lower end of the rear basket 950A and a lower end of the side basket 950B may continuously connected to each other without stepping.

A plurality of through-holes may be defined in the basket 940. The user may easily check items contained in the accommodation space S1 through the plurality of through-holes.

The module base 960 may define a bottom surface of the service module M. The module base 960 may be plate shape with a predetermined thickness. The module base 960 may be mounted on a rear module mounting part 923 included in the front module 910.

The module base 960 may be connected to the basket 950 at a lower side of the basket 950. In more detail, module base coupling parts 952 and 953 to which the module base 960 is coupled may be disposed on a lower portion of the basket 950. The module base 960 may be coupled to the module base coupling parts 952 and 953 at the lower side of the module base 960.

The module base coupling parts 952 and 953 may include a connection part connecting lower ends of both side baskets 950B to each other and an extension part 953 extending inward from each of the lower ends of the connection part 952 and the basket 950.

The guide insertion part 961 described above may be defined in the bottom surface of the module base 960. The guide insertion part 961 may be defined to pass through the module base 960 vertically.

Also, the coupling hole 962A described above may be defined in the bottom surface of the module base 960. In more detail, a coupling groove 962 recessed downward may be defined in a top surface of the module base 960, and the coupling hole 962A may be defined to pass from the coupling groove 962 to a bottom surface of the module base 960. As a result, a portion of an upper side of the coupling member C passing through the coupling hole 962A, i.e., the head part C1 (see FIG. 11) may be disposed in the coupling groove 962.

As described above, the module guide 231 may be inserted into the guide insertion part 961 through the sub through-hole 411 defined in the module support plate 400. In this case, the module guide 231 may be disposed at the second position P2 (see FIG. 8).

Also, the module coupling part 232 may face the coupling hole 962A through the sub opening hole 412 defined in the module support plate 400. The coupling member C may be coupled to the module coupling part 232 by passing through the coupling hole 962A and then passing through the sub opening hole 412. In this case, the module coupling part 232 is disposed at the fourth position P4 (see FIG. 8).

On the other hand, the base cover 970 may cover the module base 960 from an upper side. Also, the base cover 970 may cover the module base coupling parts 952 and 953 from a lower side. As a result, the base cover 970 may define a bottom surface of the accommodation space S1.

The base cover 970 may cover the coupling member C disposed in the guide insertion part 961, the coupling groove 962, and the coupling member C disposed in the coupling groove 962 from the upper side.

The operator may separate the base cover 970 from the module base 960 and couple the coupling member C to the coupling hole 962A through the coupling groove 962 or separate the coupling member C from the coupling hole 962A. Thereafter, the operator may mount the base cover 970 on the upper side of the module base 960.

Figure 18:
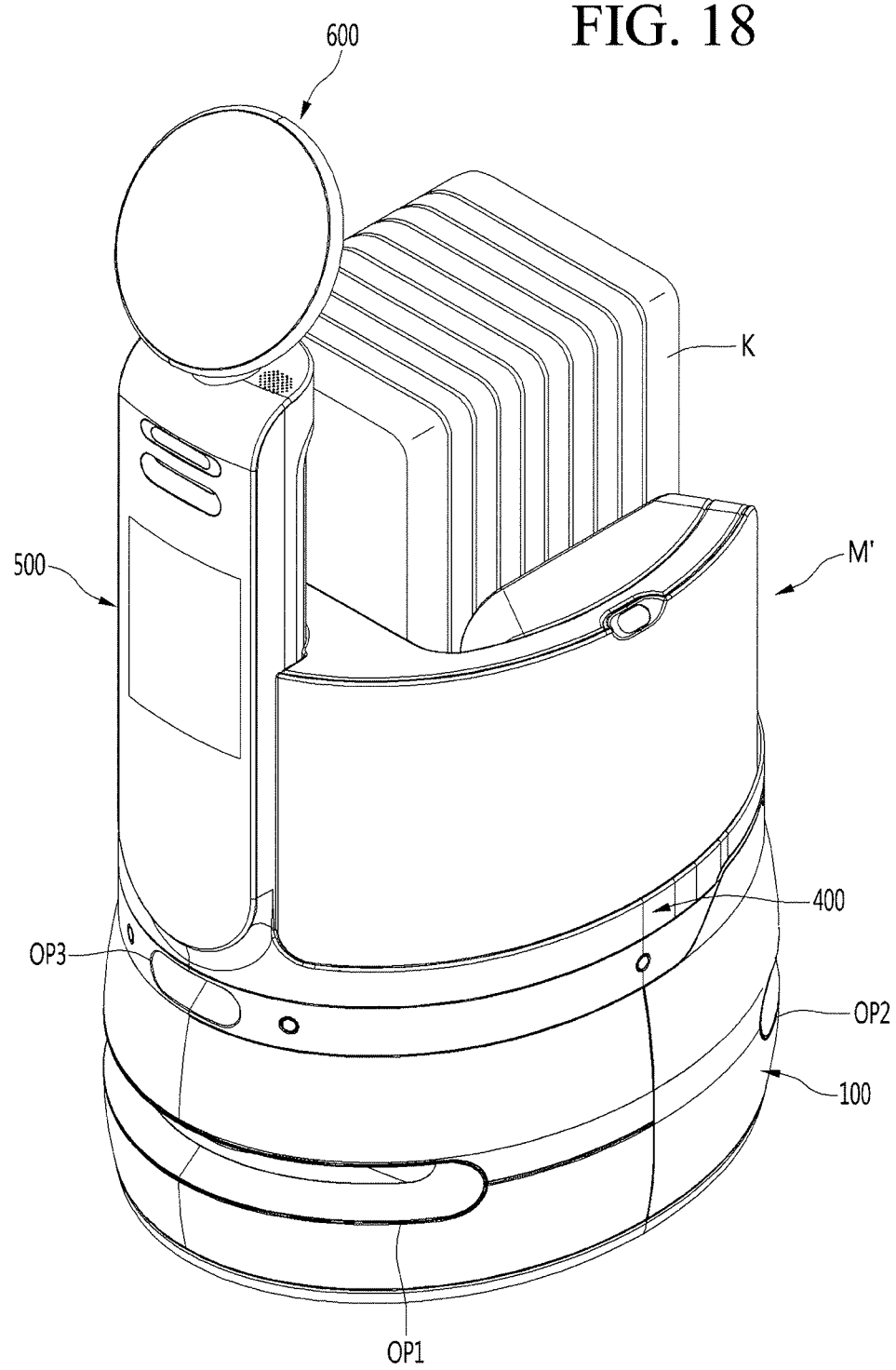
FIG. 18 is a perspective view illustrating a state in which a service module is mounted on a movable robot according to another embodiment.
Figure 19:
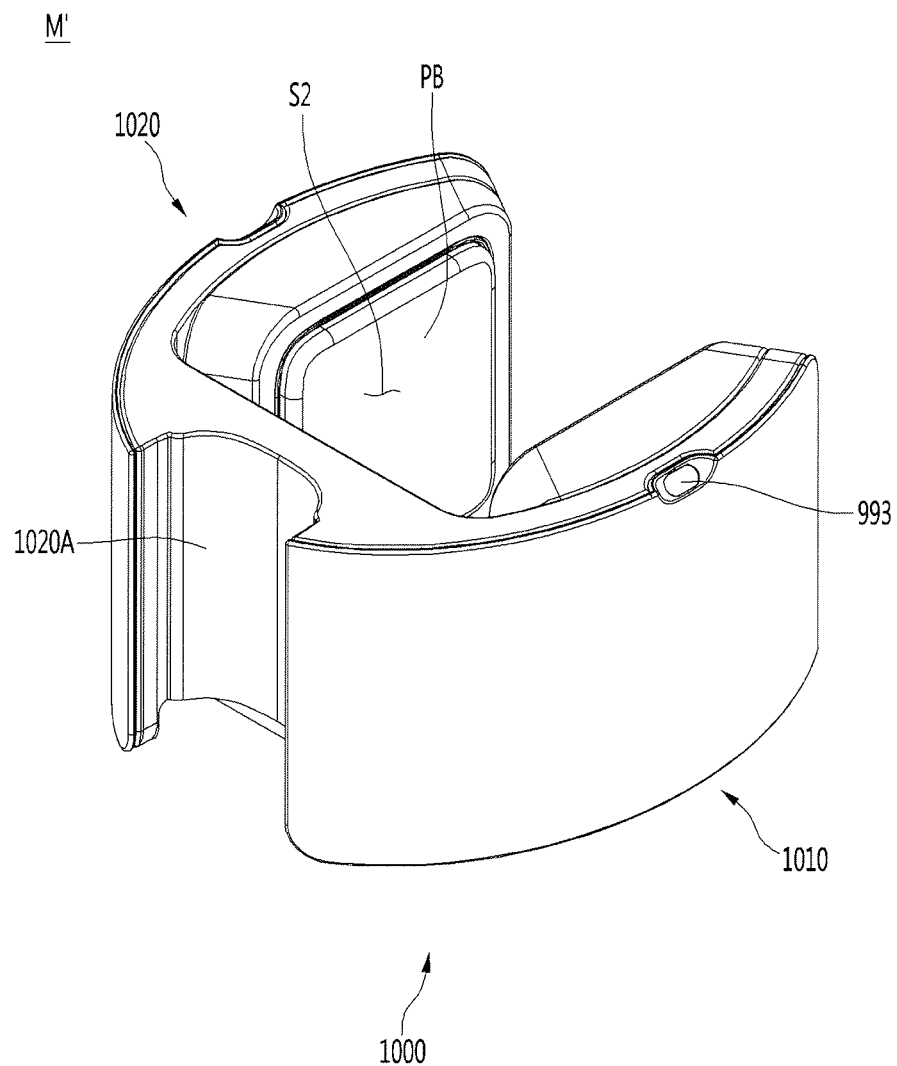
FIG. 19 is a perspective view of the service module according to another embodiment.

FIG. 18 is a perspective view illustrating a state in which a service module M' is mounted on a movable robot 1 according to another embodiment, and FIG. 19 is a perspective view of the service module M' according to another embodiment.

A service module M' according to this embodiment may be referred to as a porter module M'.

The porter module M' may carry an article K (e.g., baggage) at a hotel, resort, airport, etc., and the porter module M' may support the article so that the article is not shaken.

One example of the porter module M' may be provided separately from the movable robot 1 and may be detachably coupled to the movable robot 1.

The porter module M' may be mounted on the movable robot 1 and may move together with the movable robot 1 when the movable robot 1 moves.

The porter module M' may include a main body 1000 and a pair of pressing bodies PB.

The main body 1000 may define an outer appearance of the porter module M'.

A guide groove 1020A into which a body display part 500 is fitted may be defined in a front portion of the main body 1000.

The main body 1000 may have a space S2 in which at least a portion of the baggage K is accommodated, and the space S2 may be a baggage accommodation space.

The space S2 may be defined so that each of top and rear surfaces is opened inside the main body 1000, and the space S2 of the main body 1000 may be an open space in which the upper and rear surfaces are opened to access the baggage.

A guide insertion part 961 (see FIG. 17), a coupling groove 962, and a coupling hole 962A may be defined in a bottom surface of the main body 1000, like the service module M according to the above-described embodiment.

The main body 1000 may include a left body 1010 and a right body 1020, which are spaced apart from each other in a left and right direction.

The space S2 in which the baggage K may be accommodated may be a space defined between the left body 1010 and the right body 1020. The baggage K may be fixed by the pair of pressing bodies PB in the space S2 between the left body 1010 and the right body 1020.

The pair of pressing bodies PB may be provided on inner surfaces of the left body 1010 and the right body 1020, respectively. The pair of pressing bodies PB may be spaced apart from each other and face each other.

An adjustment mechanism accommodation space may be defined inside the main body 1000. In this case, an adjustment mechanism that drives the pressing body PB in the horizontal direction may be accommodated in the accommodation mechanism accommodation space.

For example, the adjustment mechanism is capable of adjusting an interval between the pair of the pressing bodies PB by allowing at least one of the left and right pressing bodies PB to move. As a result, the pair of pressing bodies PB may firmly fix the baggage K.

Figure 20:
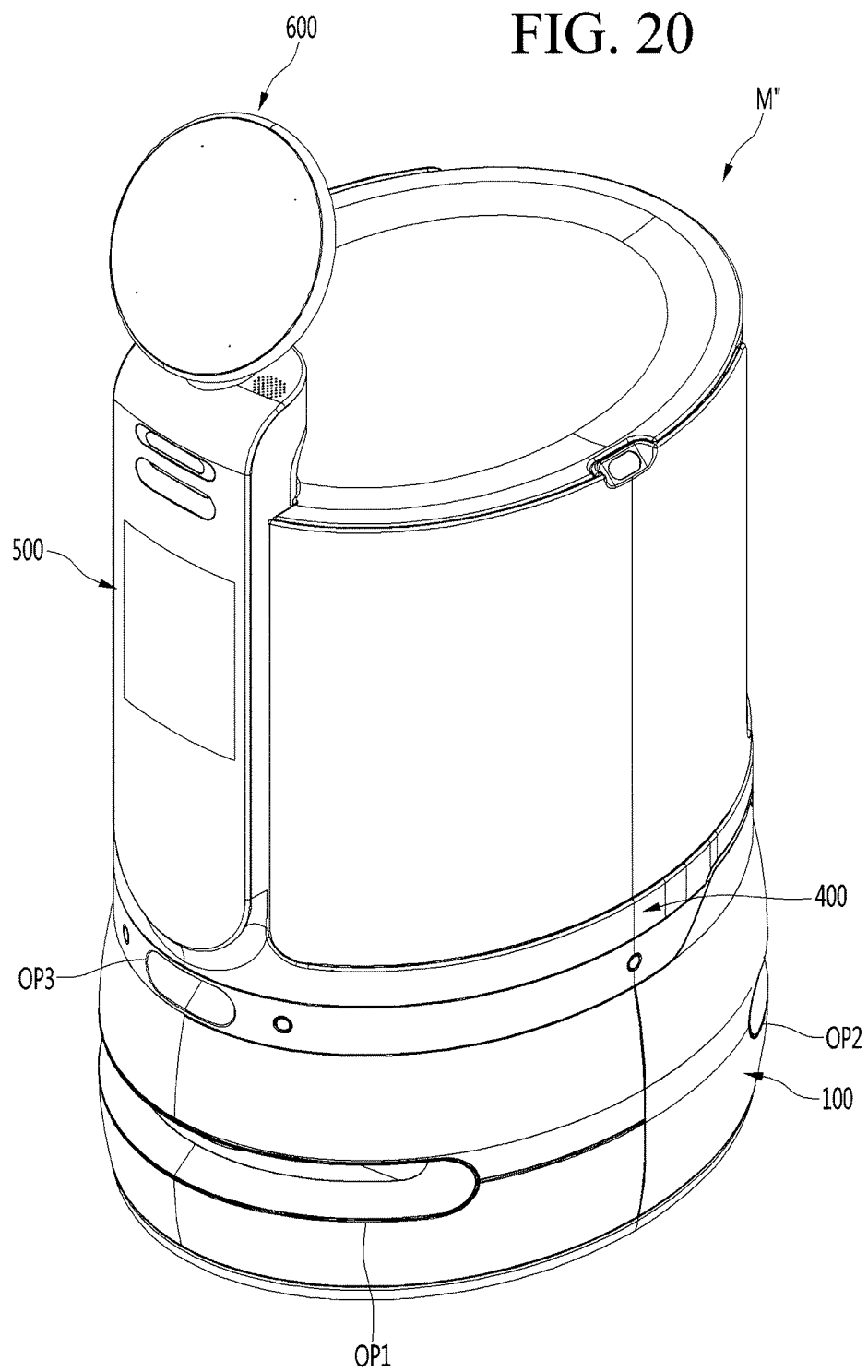
FIG. 20 is a perspective view illustrating a state in which a service module is mounted on a movable robot according to further another embodiment.
Figure 21:
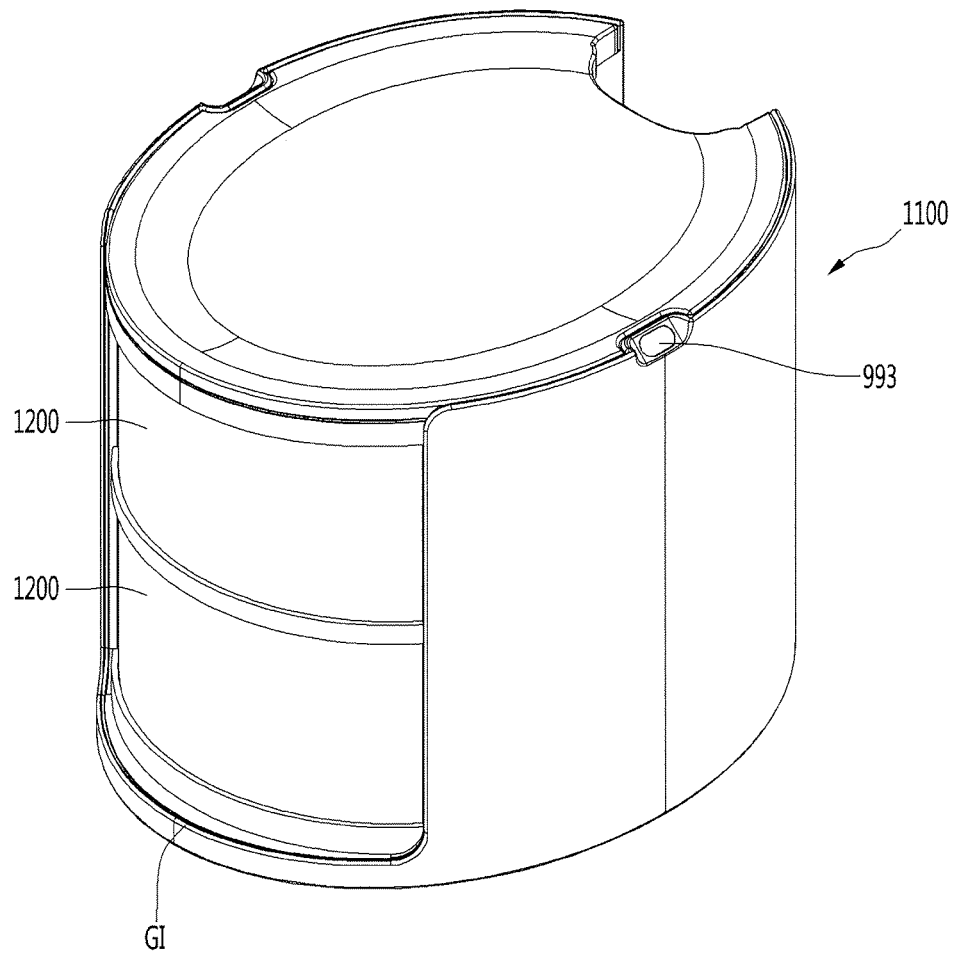
FIG. 21 is a perspective view of a service module according to further another embodiment.

FIG. 20 is a perspective view illustrating a state in which a service module M″ is mounted on a movable robot 1 according to further another embodiment, and FIG. 21 is a perspective view of a service module M″ according to further another embodiment.

A service module M" according to this embodiment may be referred to as a serving module M".

The serving module M" may serve an item at a restaurant such as a hotel or a restaurant, and the serving module M" may be configured to cleanly and safely serve the item to be served to the user.

An example of the serving module M" may be provided separately from the movable robot 1 and may be detachably coupled to the movable robot 1.

The serving module M" may be mounted on the movable robot 1, may move together with the movable robot 1 when the movable robot 1 moves, and may be carried by the movable robot 1.

The serving module M" may include a main body 1100 and at least one door 1200.

The main body 1100 may form an outer appearance of the serving module M".

At least one tray may be provided inside the main body 1100. That is, a tray space in which the tray is accommodated may be defined in the main body 1100. The tray entrance GI may be provided in the main body 1100. The tray entrance GI may face the tray space.

A guide insertion part 961 (see FIG. 17), a coupling groove 962, and a coupling hole 962A may be defined in a bottom surface of the main body 1100, like the service module M according to the above-described embodiment.

At least one door 1200 may be provided and two doors 1200 are shown in FIG. 21. The door 1200 may open or close the tray entrance GI.

According to the embodiment, the module guide may guide the installation position of the service module. Also, the module coupling part may be coupled by the service module and the coupling member. Thus, the service module may be easily mounted to the movable robot.

Also, the module guide may rotate between the first position in the main body and the second position of the main body, which protrudes upward. As a result, when the service module is not mounted on the movable robot, the module guide may be hidden inside the main body. Therefore, not only the outer appearance of the movable robot may be improved in design, but also other objects instead of the service module may be easily placed on the movable robot.

Also, the module coupling part may rotate between the third position within the main body and the fourth position facing an upper side of the main body. Thus, when the service module is not mounted on the movable robot, the module coupling part and the coupling member mounted on the module coupling part may be hidden inside the main body. Therefore, not only the outer appearance of the movable robot may be improved in design, but also other objects instead of the service module may be easily placed on the movable robot.

Also, the opening hole may have a size at which the coupling member passes. As a result, since the coupling member is stored inside the main body while being coupled to the module coupling part, a risk of losing the coupling member may be reduced.

Also, the module guide may be temporarily fixed by the guide detent. As a result, the guide detent may be fixed to the first position or the second position so as not to move unless the sufficient external force is applied to the module guide.

Also, the module coupling part may be temporarily fixed by the coupling part detent. As a result, the coupling part detent may be fixed to the third position or the fourth position so as not to move unless the sufficient external force is applied to the module coupling part.

Also, the module support plate may have the sub through-hole through which the module guide passes and the sub opening hole through which the coupling member passes. Thus, the service module may be easily mounted on the upper side of the module support plate.

Also, the main body may include the housing and the top plate, and the through-hole and the opening hole may be defined to pass through the top plate vertically. Thus, the module guide disposed at the first position and the module coupling disposed at the third position may be protected by the housing at the lower side of the top plate.

Also, at least one of the guide supporter or the coupling part supporter may be coupled to the bottom surface of the top plate. Thus, when the module guide and the module coupling part rotates upward, the module guide and the module coupling part may protrude upward and be mounted on the service module.

Also, the guide insertion part into which the module guide is inserted may be defined in the module base of the service module. Thus, the installation position of the service module may be not only guided but also fixed in the horizontal direction.

Also, the coupling hole through which the coupling member passes may be defined in the module base, and the coupling member may be coupled to the module coupling part. As a result, the service module M may be fixed not only in the horizontal direction but also in the vertical direction.

Also, the coupling groove recessed downward from the top surface of the module base may be defined in the module base, and the coupling hole may pass from the coupling groove to the bottom surface of the module base. Thus, a portion of the upper portion (head part) of the coupling member passing through the coupling hole may be disposed so as not to protrude to the upper side of the module base.

Also, the base cover may cover the module base at the upper side. Thus, the guide insertion part and the coupling groove, which are defined in the module base, may be covered.

The above-disclosed subject matter is to be considered illustrative, and not restrictive, and the appended claims are intended to cover all such modifications, enhancements, and other embodiments, which fall within the true spirit and scope of the present disclosure.

Thus, the embodiment of the present disclosure is to be considered illustrative, and not restrictive, and the technical spirit of the present disclosure is not limited to the foregoing embodiment.

Therefore, the scope of the present disclosure is defined not by the detailed description of the disclosure but by the appended claims, and all differences within the scope will be construed as being included in the present disclosure.

What is claimed is:

1. A movable robot, comprising:
   a main body including a top surface, wherein the top surface of the main body includes at least one through-hole;
   a traveling part disposed in the main body;
   a service part disposed above the main body;
   at least one module guide configured to guide an installation position of the service part; and
   a guide supporter configured to rotatably support the at least one module guide inside the main body,
   wherein the at least one module guide rotates between a first position within the main body and a second position protruding upward from the main body through the through-hole, wherein one of the at least one module guide and the guide supporter is provided with a guide detent configured to temporarily fix the at least one module guide, and wherein an other of the at least one module guide and the guide supporter comprises:
- a first hook groove that is hooked with the guide detent when the at least one module guide is disposed at a first position; and
- a second hook groove that is hooked with the guide detent when the at least one module guide is disposed at a second position.

2. The movable robot according to claim 1, further comprising a module support plate mounted on the top surface of the main body, the module support plate being configured to support a lower portion of the service part,
wherein the module support plate includes a sub through-hole through which the at least one module guide passes.

3. The movable robot according to claim 1, further comprising:
- at least one opening hole defined in the top surface of the main body, the at least one opening hole being spaced apart from the through-hole;
- at least one module coupling part coupled to a coupling member configured to restrict movement of the service part; and
- a coupling part supporter configured to rotatably support the module coupling part inside the main body,
wherein the module coupling part rotates between a third position within the main body and a fourth position facing an upper side of the main body through the at least one opening hole.

4. The movable robot according to claim 3, wherein the coupling member is coupled to one of the at least one opening hole.

5. The movable robot according to claim 3, wherein the main body further includes:
- a lower plate provided within the main body and spaced from the traveling part;
- a top plate provided within the main body and spaced upwards from the lower plate, the top plate being configured to define the top surface of the main body; and
- a housing configured to surround edges of the lower plate and the top plate, and
wherein the through-hole and the at least one opening hole are vertically penetrated by the top plate.

6. The movable robot according to claim 5, wherein at least one of the guide supporter or the coupling part supporter is coupled to a bottom surface of the top plate.

7. A movable robot, comprising:
- a main body including a top surface, wherein the top surface of the main body includes at least one through-hole;
- a traveling part disposed in the main body;
- a service part disposed above the main body;
- at least one module guide configured to guide an installation position of the service part; and
- a guide supporter configured to rotatably support the at least one module guide inside the main body,
wherein the at least one module guide rotates between a first position within the main body and a second position protruding upward from the main body through the through-hole,
wherein the movable robot further comprises:
- at least one opening hole defined in the top surface of the main body, the at least one opening hole being spaced apart from the through-hole;
- at least one module coupling part coupled to a coupling member configured to restrict movement of the service part; and
- a coupling part supporter configured to rotatably support the module coupling part inside the main body,
wherein the module coupling part rotates between a third position within the main body and a fourth position facing an upper side of the main body through the at least one opening hole,
wherein one of the module coupling part and the coupling part supporter is provided with a coupling part detent configured to temporarily fix the module coupling part, and
wherein an other of the module coupling part and the coupling part supporter comprises:
- a third hook groove that is hooked with the coupling part detent when the module coupling part is disposed at the third position; and
- a fourth hook groove that is hooked with the coupling part detent when the module coupling part is disposed at the fourth position.

8. A movable robot, comprising:
- a main body including a top surface, wherein the top surface of the main body includes at least one through-hole;
- a traveling part disposed in the main body;
- a service part disposed above the main body;
- at least one module guide configured to guide an installation position of the service part; and
- a guide supporter configured to rotatably support the at least one module guide inside the main body,
wherein the at least one module guide rotates between a first position within the main body and a second position protruding upward from the main body through the through-hole,
wherein the movable robot further comprises:
- at least one opening hole defined in the top surface of the main body, the at least one opening hole being spaced apart from the through-hole;
- at least one module coupling part coupled to a coupling member configured to restrict movement of the service part; and
- a coupling part supporter configured to rotatably support the module coupling part inside the main body,
wherein the module coupling part rotates between a third position within the main body and a fourth position facing an upper side of the main body through the at least one opening hole,
wherein further comprising a module support plate mounted on the top surface of the main body, the module support plate being configured to support a lower portion of the service part, and
wherein the module support plate includes:
- a sub through-hole through which the at least one module guide passes; and
- a sub opening hole through which the coupling member passes.

9. A movable robot, comprising:
- a main body including a top surface, wherein the top surface of the main body includes at least one through-hole;
- a traveling part disposed in the main body;
- a service part disposed above the main body;

at least one module guide configured to guide an installation position of the service part; and a guide supporter configured to rotatably support the at least one module guide inside the main body, wherein the at least one module guide rotates between a first position within the main body and a second position protruding upward from the main body through the through-hole, wherein the movable robot further comprises:

at least one opening hole defined in the top surface of the main body, the at least one opening hole being spaced apart from the through-hole;

at least one module coupling part coupled to a coupling member configured to restrict movement of the service part; and a coupling part supporter configured to rotatably support the module coupling part inside the main body, wherein the module coupling part rotates between a third position within the main body and a fourth position facing an upper side of the main body through the at least one opening hole, wherein the service part comprises a module base, the module base defining a bottom surface of the service part, and wherein the module base comprises:

a guide insertion part, wherein the at least one module guide is inserted into the guide insertion part; and a coupling hole which is spaced apart from the guide insertion part and through which the coupling member passes.

10. The movable robot according to claim 9, wherein the module base includes a coupling groove recessed downward from a top surface of the module base, and wherein the coupling hole passes from the coupling groove to the bottom surface of the service part.

11. The movable robot according to claim 9, wherein the service part further includes a base cover configured to cover an upper side of the module base.

* * * * *